(12) United States Patent
Nance

(10) Patent No.: US 11,410,183 B2
(45) Date of Patent: Aug. 9, 2022

(54) METHOD TO RECOVER NON-RECOGNIZED ERRORS IN AIRCRAFT WEIGHT DETERMINATIONS TO INCREASE WEIGHT AND CENTER OF GRAVITY LIMITATIONS FOR REGULATED AIRCRAFT

(71) Applicant: C. Kirk Nance, Keller, TX (US)

(72) Inventor: C. Kirk Nance, Keller, TX (US)

(*) Notice: Subject to any disclaimer, the term of this patent is extended or adjusted under 35 U.S.C. 154(b) by 40 days.

(21) Appl. No.: 15/917,149

(22) Filed: Mar. 9, 2018

(65) Prior Publication Data

US 2021/0319455 A1 Oct. 14, 2021

Related U.S. Application Data

(62) Division of application No. 14/924,332, filed on Oct. 27, 2015, now Pat. No. 10,089,634.

(51) Int. Cl.
*G06Q 30/00* (2012.01)
*G01G 19/07* (2006.01)

(52) U.S. Cl.
CPC ........... *G06Q 30/018* (2013.01); *G01G 19/07* (2013.01)

(58) Field of Classification Search
CPC .............................. G06Q 30/018; G01G 19/07
See application file for complete search history.

(56) References Cited

U.S. PATENT DOCUMENTS

| | | |
|---|---|---|
| 2,443,045 A | 6/1948 | Bender, Jr. et al. |
| 2,559,718 A | 7/1951 | Goodlett et al. |
| 2,587,628 A | 3/1952 | King |
| 2,735,291 A | 2/1956 | Quinn |
| 2,754,107 A | 7/1956 | Ernst et al. |
| 2,759,356 A | 8/1956 | Truett et al. |
| 2,806,686 A | 9/1957 | Miller, Jr. |

(Continued)

FOREIGN PATENT DOCUMENTS

| | | |
|---|---|---|
| EP | 2672238 | 11/2013 |
| WO | 0106827 | 7/2000 |

OTHER PUBLICATIONS

Transportation Safetyboard of Canada, Aviation Investigation Report A10A0032, Mar. 24, 2010 (24.ce.2010) [retrieved on Jul. 3, 2012 (Jul. 3, 2012)] Retrieved from the Internet: <URL: http://www.tsb.gc.ca/eng/rapports-reports/aviation/2010/a10a0032/a10a0032.pdf> pp. 14, 20.

(Continued)

*Primary Examiner* — Marthe Y Marc-Coleman
(74) *Attorney, Agent, or Firm* — Brian K. Yost; Decker Jones, PC

(57) ABSTRACT

A method of establishing a justification basis to Aircraft Regulatory Authorities, to allow a regulated aircraft to operate at increased maximum weight limitations, through the statistical identification of non-recognized weight errors being allowed in today's aircraft weight determination methods, with the recovery and utilization of the non-recognized weight errors to increase weight limitations through a Regulatory Authority finding of an Equivalent Level of Safety. A system for use in measuring aircraft weight and center of gravity, providing a method to reveal non-recognized weight errors. Sensors are attached to the landing gear struts, so to periodically and randomly measure and monitor aircraft weight and center of gravity.

17 Claims, 14 Drawing Sheets

(56) References Cited

U.S. PATENT DOCUMENTS

| | | |
|---|---|---|
| 3,194,058 A | 7/1965 | Haig |
| 3,208,266 A | 9/1965 | Black |
| 3,263,497 A | 8/1966 | Leiber |
| 3,273,382 A | 9/1966 | Fonash |
| 3,401,388 A | 9/1968 | Phillips |
| 3,499,500 A | 3/1970 | Harding |
| 3,513,300 A | 5/1970 | Elfenbein |
| 3,517,550 A | 6/1970 | Leventhal |
| 3,584,503 A | 6/1971 | Senour |
| 3,701,279 A | 10/1972 | Harris et al. |
| 3,712,122 A | 1/1973 | Harris et al. |
| 3,900,828 A | 8/1975 | Lage et al. |
| 3,944,729 A | 3/1976 | Tsoubanos |
| 3,946,358 A | 3/1976 | Bateman |
| 3,960,013 A | 6/1976 | Ormond |
| 4,110,605 A | 8/1978 | Miller |
| 4,225,926 A | 9/1980 | Wendt |
| 4,278,219 A | 7/1981 | Finance |
| 4,302,827 A | 11/1981 | Rosenblum |
| 4,357,661 A | 11/1982 | Lambregts et al. |
| 4,385,527 A | 5/1983 | Raskin |
| 4,446,524 A | 5/1984 | Wendt |
| 4,490,802 A | 12/1984 | Miller |
| 4,551,723 A | 11/1985 | Paterson |
| 4,628,564 A | 12/1986 | Youssef |
| 4,671,650 A | 6/1987 | Hirzel et al. |
| 4,685,143 A | 8/1987 | Choate |
| 4,770,372 A | 9/1988 | Ralph |
| 4,889,202 A | 1/1989 | Bron |
| 4,869,444 A | 9/1989 | Ralph |
| 4,979,154 A | 12/1990 | Brodeur |
| 5,214,586 A | 5/1993 | Nance |
| 5,222,399 A | 6/1993 | Kropp |
| 5,260,702 A | 11/1993 | Thompson |
| 5,406,487 A | 4/1995 | Tanis |
| 5,511,430 A | 4/1996 | Delest et al. |
| 5,521,827 A | 5/1996 | Lindberg et al. |
| 5,548,517 A | 8/1996 | Nance |
| 6,012,001 A | 1/2000 | Scully |
| 6,120,009 A | 9/2000 | Gatehouse et al. |
| 6,128,951 A | 10/2000 | Nance |
| 6,193,190 B1 | 2/2001 | Nance |
| 6,237,408 B1 | 5/2001 | Nance |
| 6,293,141 B1 | 9/2001 | Nance |
| 6,353,793 B1 | 3/2002 | Godwin et al. |
| 6,441,324 B1 | 8/2002 | Stimpson |
| 6,676,075 B2 | 1/2004 | Cowan et al. |
| 7,193,530 B2 | 3/2007 | Nance |
| 7,274,309 B2 | 9/2007 | Nance |
| 7,274,310 B1 | 9/2007 | Nance |
| 7,356,483 B2 | 4/2008 | Shirley et al. |
| 8,042,765 B1 | 10/2011 | Nance |
| 8,055,396 B2 | 11/2011 | Yates et al. |
| 8,060,296 B2 | 11/2011 | Vetsch |
| 8,180,504 B1 | 5/2012 | Nance |
| 8,258,414 B2 | 9/2012 | Toms |
| 8,543,322 B1 | 8/2013 | Nanc |
| 2004/0129834 A1 | 7/2004 | Luce |
| 2004/0226996 A1* | 11/2004 | Stefani .................. G01G 19/07 235/384 |
| 2005/0229968 A1 | 10/2005 | Jones et al. |
| 2007/0012106 A1* | 1/2007 | Mardirossian ......... G01G 19/07 73/500 |
| 2007/0124034 A1 | 5/2007 | Pitard et al. |
| 2007/0265739 A1 | 11/2007 | Griffin |
| 2008/0033607 A1 | 2/2008 | Zeliff et al. |
| 2008/0119967 A1 | 5/2008 | Long et al. |
| 2009/0292483 A1 | 11/2009 | Journade et al. |
| 2010/0017052 A1 | 1/2010 | Luce |
| 2010/0076672 A1* | 3/2010 | Cremers ................ G06Q 10/04 701/123 |
| 2010/0161174 A1 | 6/2010 | Yates et al. |
| 2011/0087424 A1 | 4/2011 | Long et al. |
| 2012/0041639 A1 | 2/2012 | Followell et al. |
| 2012/0095703 A1 | 4/2012 | Zakrzewski et al. |
| 2012/0143485 A1 | 6/2012 | Mancin et al. |
| 2015/0241295 A1* | 8/2015 | Fuscone ................ B64D 45/00 701/124 |

OTHER PUBLICATIONS

B777 IOE & Training Reference Guide, May 15, 2011 (May 15, 2011) [retrieved on Jul. 3, 2012 (Jul. 3, 2012)] Retrieved from the Internet:<URL: http://777cheatsheets.com/resources/B777_IOE_Guide/pdf> pp. 28-29.

* cited by examiner

FIG. 4

Boeing 737-800

| | 1 | 2 | 3 | 4 | 5 | 6 | 7 | 8 |
|---|---|---|---|---|---|---|---|---|
| | OEW | FUEL | CATERING | FLIGHT CREW | CARGO | CHECKED BAGS | PASSENGERS | TOTAL AIRCRAFT WEIGHT |
| | Operating *Empty* Weight of the aircraft measured on scales | measured gallons of fuel pumped into the aircraft as gallons, then converted to pounds at 6.8 lbs per gal | assigned Weight of catering cart including all food, beverages, ice and associated utensils | assigned Weight of cockpit/cabin crew members and their associated baggage | measured Weight of each cargo item 1-6 | assumed number of bags based upon passenger count, with Weight assigned based on 2 bag sizes | number of passengers with assigned weight of 190 lbs. | "LBUM" Load Build-Up Method |
| | | gallons | 6,000 | cart #1 | 128 | pilot | 240 | 1 | 128 | bags | 116 | passengers | 174 | |
| | | lbs/gal | 6.8 | cart #2 | 128 | co-pilot | 240 | 2 | 56 | weight | 28.9 | weight | 190 | |
| | | | | cart #3 | 128 | attendant | 210 | 3 | 112 | sub-total | 3,352 | | | |
| | | | | | | attendant | 210 | 4 | 88 | heavy bags | 58 | | | |
| | | | | | | attendant | 210 | 5 | 146 | weight | 58.7 | | | |
| | | | | | | attendant | 210 | 6 | 220 | sub-total | 3,405 | | | |
| | | | | | | | | | | total bags | 174 | | | |
| | 91,108 | | 40,800 | | 384 | | 1,320 | | 750 | | 6,757 | | 33,060 | 174,179 |

190 Pounds In Each Seat

| Aircraft Row # | A | B | C | D | E | F |
|---|---|---|---|---|---|---|
| 1 | 190.00 | 190.00 | 190.00 | 190.00 | 190.00 | 190.00 |
| 2 | 190.00 | 190.00 | 190.00 | 190.00 | 190.00 | 190.00 |
| 3 | 190.00 | 190.00 | 190.00 | 190.00 | 190.00 | 190.00 |
| 4 | 190.00 | 190.00 | 190.00 | 190.00 | 190.00 | 190.00 |
| 5 | 190.00 | 190.00 | 190.00 | 190.00 | 190.00 | 190.00 |
| 6 | 190.00 | 190.00 | 190.00 | 190.00 | 190.00 | 190.00 |
| 7 | 190.00 | 190.00 | 190.00 | 190.00 | 190.00 | 190.00 |
| 8 | 190.00 | 190.00 | 190.00 | 190.00 | 190.00 | 190.00 |
| 9 | 190.00 | 190.00 | 190.00 | 190.00 | 190.00 | 190.00 |
| 10 | 190.00 | 190.00 | 190.00 | 190.00 | 190.00 | 190.00 |
| 11 | 190.00 | 190.00 | 190.00 | 190.00 | 190.00 | 190.00 |
| 12 | 190.00 | 190.00 | 190.00 | 190.00 | 190.00 | 190.00 |
| 13 | 190.00 | 190.00 | 190.00 | 190.00 | 190.00 | 190.00 |
| 14 | 190.00 | 190.00 | 190.00 | 190.00 | 190.00 | 190.00 |
| 15 | 190.00 | 190.00 | 190.00 | 190.00 | 190.00 | 190.00 |
| 16 | 190.00 | 190.00 | 190.00 | 190.00 | 190.00 | 190.00 |
| 17 | 190.00 | 190.00 | 190.00 | 190.00 | 190.00 | 190.00 |
| 18 | 190.00 | 190.00 | 190.00 | 190.00 | 190.00 | 190.00 |
| 19 | 190.00 | 190.00 | 190.00 | 190.00 | 190.00 | 190.00 |
| 20 | 190.00 | 190.00 | 190.00 | 190.00 | 190.00 | 190.00 |
| 21 | 190.00 | 190.00 | 190.00 | 190.00 | 190.00 | 190.00 |
| 22 | 190.00 | 190.00 | 190.00 | 190.00 | 190.00 | 190.00 |
| 23 | 190.00 | 190.00 | 190.00 | 190.00 | 190.00 | 190.00 |
| 24 | 190.00 | 190.00 | 190.00 | 190.00 | 190.00 | 190.00 |
| 25 | 190.00 | 190.00 | 190.00 | 190.00 | 190.00 | 190.00 |
| 26 | 190.00 | 190.00 | 190.00 | 190.00 | 190.00 | 190.00 |
| 27 | 190.00 | 190.00 | 190.00 | 190.00 | 190.00 | 190.00 |
| 28 | 190.00 | 190.00 | 190.00 | 190.00 | 190.00 | 190.00 |
| 29 | 190.00 | 190.00 | 190.00 | 190.00 | 190.00 | 190.00 |
| Average | Non-recognised | | # PAX | Total | | |
| 190.00 | 0.00 | 0.00 | 174 | 33,060.00 | Overage | 0.00 |

FIG. 5b

Random Weight In Each Seat

| Aircraft Row # | A | B | C | D | E | F |
|---|---|---|---|---|---|---|
| 1 | 211.00 | 214.48 | 256.36 | 295.42 | 146.82 | 142.65 |
| 2 | 238.14 | 217.06 | 220.30 | 176.86 | 257.83 | 184.33 |
| 3 | 182.07 | 244.90 | 137.05 | 176.93 | 134.56 | 174.32 |
| 4 | 151.54 | 197.36 | 117.60 | 216.26 | 195.57 | 188.66 |
| 5 | 181.13 | 191.04 | 113.83 | 203.08 | 141.76 | 111.95 |
| 6 | 191.87 | 196.75 | 267.47 | 225.95 | 129.53 | 221.22 |
| 7 | 268.82 | 75.13 | 237.13 | 298.27 | 275.21 | 144.61 |
| 8 | 118.24 | 203.05 | 127.27 | 167.32 | 115.91 | 234.69 |
| 9 | 228.49 | 146.37 | 189.53 | 207.18 | 299.65 | 241.73 |
| 10 | 205.78 | 233.66 | 199.10 | 233.93 | 198.54 | 167.67 |
| 11 | 208.40 | 234.72 | 290.58 | 183.32 | 239.65 | 120.83 |
| 12 | 126.44 | 136.18 | 104.17 | 152.05 | 200.92 | 177.64 |
| 13 | 270.99 | 179.60 | 174.42 | 285.61 | 240.82 | 137.40 |
| 14 | 232.89 | 247.93 | 221.25 | 177.87 | 298.02 | 187.57 |
| 15 | 233.22 | 205.97 | 263.22 | 145.91 | 222.11 | 182.25 |
| 16 | 239.34 | 197.67 | 260.83 | 277.26 | 212.73 | 235.56 |
| 17 | 175.46 | 124.79 | 168.76 | 235.00 | 212.34 | 103.29 |
| 18 | 292.79 | 164.06 | 134.58 | 235.30 | 292.89 | 151.26 |
| 19 | 204.03 | 241.40 | 205.34 | 212.29 | 179.80 | 161.18 |
| 20 | 251.69 | 194.01 | 223.72 | 198.10 | 208.82 | 163.12 |
| 21 | 229.36 | 152.10 | 195.27 | 143.23 | 293.06 | 178.89 |
| 22 | 167.80 | 215.77 | 246.01 | 205.82 | 139.45 | 135.25 |
| 23 | 182.28 | 134.76 | 189.30 | 244.23 | 170.81 | 157.39 |
| 24 | 121.76 | 229.93 | 259.15 | 177.35 | 201.85 | 146.37 |
| 25 | 157.12 | 280.93 | 220.25 | 232.89 | 143.45 | 221.56 |
| 26 | 163.50 | 295.46 | 223.23 | 116.83 | 121.19 | 191.79 |
| 27 | 160.85 | 143.47 | 192.05 | 119.88 | 242.63 | 212.00 |
| 28 | 186.06 | 152.59 | 224.39 | 156.06 | 177.69 | 208.20 |
| 29 | 285.71 | 215.76 | 142.56 | 179.51 | 221.69 | 152.33 |
| Average | Non-recognised | | # PAX | Total | | |
| 195.87 | 5.87 | | 174 | 34,081.83 | Overage | 1,021.93 |

190 Pounds In Each Seat

| Row # | A | B | C | D | E | F |
|---|---|---|---|---|---|---|
| 1 | 190.00 | 190.00 | 190.00 | 190.00 | 190.00 | 190.00 |
| 2 | 190.00 | 190.00 | 190.00 | 190.00 | 190.00 | 190.00 |
| 3 | 190.00 | 190.00 | 190.00 | 190.00 | 190.00 | 190.00 |
| 4 | 190.00 | 190.00 | 190.00 | 190.00 | 190.00 | 190.00 |
| 5 | 190.00 | 190.00 | 190.00 | 190.00 | 190.00 | 190.00 |
| 6 | 190.00 | 190.00 | 190.00 | 190.00 | 190.00 | 190.00 |
| 7 | 190.00 | 190.00 | 190.00 | 190.00 | 190.00 | 190.00 |
| 8 | 190.00 | 190.00 | 190.00 | 190.00 | 190.00 | 190.00 |
| 9 | 190.00 | 190.00 | 190.00 | 190.00 | 190.00 | 190.00 |
| 10 | 190.00 | 190.00 | 190.00 | 190.00 | 190.00 | 190.00 |
| 11 | 190.00 | 190.00 | 190.00 | 190.00 | 190.00 | 190.00 |
| 12 | 190.00 | 190.00 | 190.00 | 190.00 | 190.00 | 190.00 |
| 13 | 190.00 | 190.00 | 190.00 | 190.00 | 190.00 | 190.00 |
| 14 | 190.00 | 190.00 | 190.00 | 190.00 | 190.00 | 190.00 |
| 15 | 190.00 | 190.00 | 190.00 | 190.00 | 190.00 | 190.00 |
| 16 | 190.00 | 190.00 | 190.00 | 190.00 | 190.00 | 190.00 |
| 17 | 190.00 | 190.00 | 190.00 | 190.00 | 190.00 | 190.00 |
| 18 | 190.00 | 190.00 | 190.00 | 190.00 | 190.00 | 190.00 |
| 19 | 190.00 | 190.00 | 190.00 | 190.00 | 190.00 | 190.00 |
| 20 | 190.00 | 190.00 | 190.00 | 190.00 | 190.00 | 190.00 |
| 21 | 190.00 | 190.00 | 190.00 | 190.00 | 190.00 | 190.00 |
| 22 | 190.00 | 190.00 | 190.00 | 190.00 | 190.00 | 190.00 |
| 23 | 190.00 | 190.00 | 190.00 | 190.00 | 190.00 | 190.00 |
| 24 | 190.00 | 190.00 | 190.00 | 190.00 | 190.00 | 190.00 |
| 25 | 190.00 | 190.00 | 190.00 | 190.00 | 190.00 | 190.00 |
| 26 | 190.00 | 190.00 | 190.00 | 190.00 | 190.00 | 190.00 |
| 27 | 190.00 | 190.00 | 190.00 | 190.00 | 190.00 | 190.00 |
| 28 | 190.00 | 190.00 | 190.00 | 190.00 | 190.00 | 190.00 |
| 29 | 190.00 | 190.00 | 190.00 | 190.00 | 190.00 | 190.00 |
| Average | Non-recognised | 0.00 | # PAX | Total | | |
| 190.00 | 0.00 | | 174 | 33,060.00 | | |
| | | | | Overage | | 0.00 |

Random Weight In Each Seat

| Row # | A | B | C | D | E | F |
|---|---|---|---|---|---|---|
| 1 | 211.00 | 214.48 | 259.38 | 295.42 | 146.82 | 142.85 |
| 2 | 238.14 | 217.06 | 220.30 | 176.86 | 257.83 | 184.33 |
| 3 | 182.07 | 244.90 | 137.05 | 216.93 | 134.56 | 174.32 |
| 4 | 191.54 | 197.36 | 117.60 | 218.26 | 195.57 | 188.66 |
| 5 | 181.13 | 191.04 | 113.93 | 203.06 | 141.76 | 111.95 |
| 6 | 191.37 | 196.75 | 267.47 | 225.95 | 129.53 | 221.22 |
| 7 | 268.82 | 75.13 | 237.13 | 298.27 | 275.21 | 144.61 |
| 8 | 110.24 | 203.05 | 127.27 | 167.32 | 115.91 | 234.69 |
| 9 | 228.48 | 146.37 | 189.53 | 207.18 | 239.65 | 241.73 |
| 10 | 205.76 | 253.66 | 199.10 | 233.83 | 198.64 | 167.67 |
| 11 | 208.40 | 234.72 | 290.58 | 183.32 | 239.65 | 120.83 |
| 12 | 126.44 | 136.18 | 104.17 | 152.05 | 200.92 | 177.64 |
| 13 | 270.99 | 179.60 | 174.42 | 235.61 | 240.82 | 137.40 |
| 14 | 232.89 | 247.93 | 221.25 | 177.87 | 298.02 | 187.57 |
| 15 | 208.22 | 205.97 | 263.22 | 145.91 | 222.11 | 182.25 |
| 16 | 239.34 | 197.67 | 168.76 | 277.26 | 212.73 | 235.56 |
| 17 | 175.46 | 124.79 | 134.58 | 255.00 | 192.94 | 103.29 |
| 18 | 292.79 | 164.06 | 205.34 | 225.30 | 225.73 | 151.26 |
| 19 | 204.03 | 241.40 | 221.25 | 212.29 | 178.80 | 161.18 |
| 20 | 251.69 | 194.01 | 223.72 | 198.10 | 208.82 | 183.12 |
| 21 | 229.36 | 152.10 | 195.27 | 143.23 | 293.06 | 178.89 |
| 22 | 167.80 | 215.77 | 246.01 | 205.82 | 139.45 | 135.25 |
| 23 | 183.28 | 134.76 | 189.30 | 244.23 | 170.81 | 157.39 |
| 24 | 121.76 | 229.33 | 259.15 | 177.35 | 201.85 | 146.37 |
| 25 | 157.12 | 280.93 | 220.25 | 232.89 | 143.45 | 221.56 |
| 26 | 163.50 | 295.46 | 223.23 | 116.83 | 121.19 | 191.79 |
| 27 | 160.85 | 143.47 | 192.05 | 119.88 | 242.63 | 212.00 |
| 28 | 186.06 | 162.59 | 224.39 | 156.06 | 177.69 | 208.20 |
| 29 | 285.71 | 215.76 | 142.56 | 179.51 | 221.89 | 152.33 |
| Average | Non-recognised | 5.87 | # PAX | Total | | 34,081.93 |
| 195.87 | | | 174 | Overage | | 1,021.93 |

| Summer Weights – Incorrectly Applied | | | Overage | 870.00 |
|---|---|---|---|---|
| | plus | 5.00 | | |
| 73%–Male, 27%–Female Weights – Applied | | | Overage | 1,680.00 |
| | plus | 21.00 | 80 | |
| | | | Cumulative Error | 3,571.93 |

AC120-27B designated weights

| | % of PAX | Total PAX | assumed # of PAX | Weight per PAX | Total Weight |
|---|---|---|---|---|---|
| personal item average weight | | | | 16.0 | |
| carry-on bage average weight | | | | 16.0 | |
| 1 carry-on + 1 personal item | 33.33% | 174 | 58.0 | 32.0 | 1,855.8 |
| 1 personal item | 33.33% | 174 | 58.0 | 16.0 | 927.9 |
| neither: personal item nor carry-on | 33.33% | 174 | 58.0 | 0.0 | 0.0 |
| assumed personal item and carry-on weight | | | | | 2,783.7 |

20% error in item counts / personal item and carry-on weights

| | error | lbs. | | | |
|---|---|---|---|---|---|
| personal item average weight + 15% error | 2.4 | lbs. | | | |
| carry-on bage average weight + 15% error | 2.4 | lbs. | | | |

| | % of PAX | Total PAX | assumed # of PAX | Weight per PAX | Total Weight |
|---|---|---|---|---|---|
| 1 carry-on + 1 personal item | 40% | 174 | 69.6 | 36.8 | 2,561.0 |
| 1 personal item | 40% | 174 | 69.6 | 18.4 | 1,280.5 |
| neither: personal item nor carry-on | 20% | 174 | 34.8 | 0.0 | 0.0 |
| applied error for personal item and carry-on weight | | | | | 3,841.5 |
| Carry-on Weight Error | | | | | 1,057.8 |

---

| | |
|---|---|
| Statistical Passenger Weight Error (as shown in FIG. 5b) | 1,021.9 |
| Incorrect 5 lbs. per Passenger Summer Weight Error (as shown in FIG. 6) | 870.0 |
| 73% Male / 27% Female Passenger Assumption Error (as shown in FIG. 6) | 1,680.0 |
| Carry-on Weight Error (as shown in FIG. 7) | 1,057.8 |
| Cumulative Error | 4,629.3 |

FIG. 8

AC120-27E designated weights — 81

| | % of PAX | Total PAX | assumed # of PAX | weight per PAX | Total Weight |
|---|---|---|---|---|---|
| checked bag average weight ÷ | 0.0 lbs. | | | 28.9 | |
| heavy checked bag average weight ÷ | 0.0 lbs. | | | 68.7 | |
| 1 checked bag + 1 heavy checked bag | 33.33% | 174 | 58.0 | 87.6 | 5,080.3 |
| 1 checked bag | 33.33% | 174 | 58.0 | 28.9 | 1,676.0 |
| neither checked bag nor heavy checked bag | 33.33% | 174 | 58.0 | 0.0 | 0.0 |
| | | | | designated checked bag weight | 6,756.3 |

20% error in personal item and carry-on weights — 83

| | % of PAX | Total PAX | assumed # of PAX | weight per PAX | Total Weight |
|---|---|---|---|---|---|
| checked bag average weight + 20% error applied | 5.8 lbs. | | | 34.7 | |
| heavy checked bag average weight + 20% error applied | 11.7 lbs. | | | 70.4 | |
| 1 checked bag + 1 heavy checked bag | 33.33% | 174 | 58.0 | 105.1 | 6,096.4 |
| 1 checked bag | 33.33% | 174 | 58.0 | 34.7 | 2,011.2 |
| neither checked bag nor heavy checked bag | 33.33% | 174 | 58.0 | 0.0 | 0.0 |
| | | | | applied errors for checked bag weight | 8,107.6 |
| | | | | Checked Bag Weight Error | 1,351.3 |

— 85

— 73c

| | |
|---|---|
| Statistical Passenger Weight Error (as shown in FIG. 5b) | 1,021.9 |
| Incorrect 5 lbs. per Passenger Summer Weight Error (as shown in FIG. 6) | 870.0 |
| 73% Male / 27% Female Passenger Assumption Error (as shown in FIG. 6) | 1,680.0 |
| Carry-on Weight Error (as shown in FIG. 7) | 1,057.8 |
| Checked Bag Weight Error (as shown in FIG. 8) | 1,351.3 |
| Cumulative Error | 5,981.0 |

FIG. 9

Boeing 737-800 ER – Fuel Weight — 87

| | |
|---|---|
| Fuel load in gallons | 6,000.0 |
| Fuel load in lbs. (x 6.8 lbs. per gal.) | 40,800.0 |
| Aircraft Fuel Indicator Accuracy Tolerance | 2.0% |
| Error in Fuel Weight | 816.0 |

73d

| | |
|---|---|
| Statistical Passenger Weight Error (as shown in FIG. 5b) | 1,021.9 |
| Incorrect 5 lbs. per Passenger Summer Weight Error (as shown in FIG. 6) | 870.0 |
| 73% Male / 27% Female Passenger Assumption Error (as shown in FIG. 6) | 1,680.0 |
| Carry-on Weight Error (as shown in FIG. 7) | 1,057.8 |
| Checked Bag Weight Error (as shown in FIG. 8) | 1,351.3 |
| 2.0% Fuel Weight Error (as shown in FIG. 9) | 816.0 |
| Cumulative Error | 6,797.0 |

FIG. 10

| Boeing 737-800 ER - Fleet Average Operating Empty Weight | |
|---|---|
| Aircraft - Operating Empty Weight | 91,108 |
| scale accuracy typical tolerance - 0.25% to full scale of 60,000 lbs. x 3 platform weighing scales. | 450.0 |
| 0.5% Error in Fleet Average Weight | 455.5 |

| | |
|---|---|
| Statistical Passenger Weight Error (as shown in FIG. 5b) | 1,021.9 |
| Incorrect 5 lbs. per Passenger Summer Weight Error (as shown in FIG. 6) | 870.0 |
| 72% Male / 27% Female Passenger Assumption Error (as shown in FIG. 6) | 1,680.0 |
| Carry-on Weight Error (as shown in FIG. 7) | 1,057.6 |
| Checked Bag Weight Error (as shown in FIG. 8) | 1,361.3 |
| 2.0% Fuel Weight Error (as shown in FIG. 19) | 816.0 |
| 0.5% Error in Scale Weight (as shown in FIG. 10) | 450.0 |
| 0.5% Error in Fleet Average Weight (as shown in this FIG. 10) | 455.5 |
| Cumulative Error | 7,702.6 |

| | |
|---|---|
| Boeing 737-800ER MTOW | 174,200 |
| OW&BS error | 1.0% |
| 1% weight curtailment with physical weighings | |
| allowed weight increase - pounds | 1,742.0 |
| | 5,960.6 |
| allowed weight increase - % of MTOW | 3.4% |

Method of Obtaining Relief from Regulated Aircraft MTOW Limitations

Compute "new" aircraft weight limitations increase based upon "periodically measured" aircraft weights recorded and compared against aircraft weight assumptions, within a "weight reliability program" to determine amount of weight difference; being the amount of aircraft weight limitation increase

Aircraft Weight Measuring "System"
*(installed onto aircraft)*

"System" Support Mechanism - documentation, processes, procedures and limitations for use including but not limited to:
- Instructions for Continuing Airworthiness *(Maintenance Instructions)*
- Approved Flight Manual Supplement covering Weight Measuring System operation and limitations and procedures to revert back to lower weight limitations with Weight Measuring System being inoperative or deactivated.

Documentation of Justification Basis - for issuance of Equivalent Level Of Safety, Special Condition, Exemption, or other alternate means of compliance with regulatory requirements including but not limited to:
- Review of historical basis of regulatory requirements for aircraft weight limitations
- Review for any flight incident records of scheduled flights departing at MTOW limitations
  o Document through statistical analysis and plotting of a bell curve illustrating at least 49% of the MTOW flights departed heavier than the recorded MTOW limitation
  o Document through statistical analysis and plotting of a bell curve illustrating at least 49% of the MTOW flights departed lighter than the recorded MTOW limitation
- Correlate the historical documentation of flights safely departing at higher take-off weights
- Review and document non-recognized statistical weight errors currently being allowed:
  o Errors in passenger weight assumptions
  o Errors in baggage weight assumptions
  o Errors in conversion to fuel pumped into aircraft as from gallons, then converted to pounds
  o Errors in aircraft "fleet average" operating empty weights
- Review and document safety enhancements resulting from:
  o Ability to accurately measure aircraft take-off weight
- Calculate a suitable percentage of weight limitation increase, predicated to a lesser amount of non-recognized weight errors, than historically allowed.

Submit request to Regulatory Authority for relief from current MTOW limitations based on assumptions, to a "To Be Determined" higher weight limitation value based upon issuance of an Equivalent Level Of Safety or other qualifying approval document

FIG. 12

METHOD TO RECOVER NON-RECOGNIZED ERRORS IN AIRCRAFT WEIGHT DETERMINATIONS TO INCREASE WEIGHT AND CENTER OF GRAVITY LIMITATIONS FOR REGULATED AIRCRAFT

BACKGROUND OF THE INVENTION

For safe operation of an aircraft, the weight of the aircraft must be determined prior to take-off. Airlines (also referred to as: FAA/Part 121 "Air Carriers") have strict departure schedules which are maintained to maximize aircraft utilization each day. Today's airline operations typically do not place fully loaded aircraft upon scales as a means to measure the aircraft weight, and the distribution of that weight commonly referred to as the aircraft Center of Gravity ("CG"): prior to an aircraft's departure ("dispatch") from an airport gate.

On any single day within the United States, airlines average 28,537 departures; where each of these air carriers must determine the weight and CG for each aircraft prior to departure. United States population has progressively become heavier over the years; thereby the individual weight of each passenger on these aircraft has become heavier. Airlines around the world operate on a very strict time-schedules, where even a short departure delay occurring early in the day can have a ripple effect and create scheduling problems throughout the airline's remaining flight schedule. Aircraft load planning is a crucial part of keeping an airline operating on schedule. A scheduled aircraft departure will commence its load planning process up to one year prior to the actual flight. Airlines do not offer ticket sales for a flight more than twelve months prior to the flight. As each ticket for a scheduled flight is purchased, the average passenger and average checked bag weights are assigned into a computer program, continually updating throughout the year the planned load for that flight. Aircraft have a Maximum Take-Off Weight "MTOW" limitation. Airline load planning procedures use assumptions as to the weight of passengers and baggage loaded onto the aircraft, to stay below the aircraft MTOW limitation.

In the United States of America, aircraft weights are limited by Federal Aviation Administration "FAA" regulation. The FAA is the Regulatory Authority which regulates the design, development, manufacture, modification and operation of all aircraft operated within the United States, and will be referenced along with the term "Regulatory Authority" to indicate both the FAA and/or any governmental organization (or designated entity) charged with the responsibility for either initial certification of aircraft or modifications to the certification of aircraft. Examples of other Regulatory Authorities would include: European Aviation Safety Agency "EASA", within most European countries; Transport Canada, Civil Aviation Directorate "TCCA", in Canada; Agência Nacional de Avição Civil "ANAC" in Brazil; or other such respective Regulatory Authority within other such respective countries.

FAA Regulations (provided in the Code of Federal Regulations) are the governmental regulations which detail the requirements necessary for an aircraft to receive certification by the Regulatory Authority within the United States. These would be equivalent to such regulations within the Joint Aviation Regulations "JARs" which are used in many European countries.

Title 14 of the Code of Federal Regulations, Part 25 refers to regulations which control the certification of Air Transport Category aircraft ("Part 25 aircraft".) Part 25 aircraft include most of the commercial passenger aircraft in use today. For example, Part 25 aircraft includes Boeing model numbers 737, 747, 757, 767, 777; Airbus A300, A310, A320, A330, A340, etc. The methods described herein provide the justification basis needed for a Regulatory Authority to allow increases to the aircraft weight limitations and expansion of the aircraft CG limitations, in particular for airlines which do not provide assigned seating for their passengers. The FAA regulations allow for control mechanisms to assure Part 121 air carriers manage aircraft loading procedures to confirm at the completion of the loading process that the aircraft load remains within the aircraft's certified forward and aft CG limits.

In particular:
Title 14—Code of Federal Regulations:
Part 121-695, subparagraph (d)
§ 121.695 Load Manifest: All Certificate Holders
  The load manifest must contain the following information concerning the loading of the airplane at takeoff time:
  (a) The weight of the aircraft, fuel and oil, cargo and baggage, passengers and crew members.
  (b) The maximum allowable weight for that flight that must not exceed the least of the following weights:
    (1) Maximum allowable takeoff weight for the runway intended to be used (including corrections for altitude and gradient, and wind and temperature conditions existing at the takeoff time).
    (2) Maximum takeoff weight considering anticipated fuel and oil consumption that allows compliance with applicable en route performance limitations.
    (3) Maximum takeoff weight considering anticipated fuel and oil consumption that allows compliance with the maximum authorized design landing weight limitations on arrival at the destination airport.
    (4) Maximum takeoff weight considering anticipated fuel and oil consumption that allows compliance with landing distance limitations on arrival at the destination and alternate airports.
  (c) The total weight computed under approved procedures,
  (d) Evidence that the aircraft is loaded according to an approved schedule that insures that the center of gravity is within approved limits.
  (e) Names of passengers, unless such information is maintained by other means by the certificate holder.

If an airline is found to be operating a Regulated aircraft with weights in excess of the aircraft's certified weight limitations, that airline is subject to Federal penalties and fines. It is a violation of Federal Law to knowingly operate an aircraft, when the aircraft weight has exceeded any of the Original Equipment Manufacturer's ("OEM's") certified weight limitations.

All air carriers must have FAA approved procedures in place ("an approved schedule"), in which the air carrier will follow such procedures to insure each time an aircraft is loaded, the load will be distributed in a manner that the aircraft CG will remain within the forward and aft CG limitations. The FAA and the specific air carrier develop these procedures, which are often referred to as "loading laws," and when implemented define how the aircraft is loaded. An accurate determination of the total passenger weight portion of a flight could most readily be accomplished by having a scale located at the entrance to the aircraft door, by which all weight that enters the aircraft would be measured. Though this solution sounds simple, having the measured weight of the passengers and their carry-on items would cause substantial disruption in an airline's daily flight schedule if the aircraft in which the planned load where to have all of the loaded weights measured; to only at moments before the aircraft is scheduled to depart finds the aircraft weight now exceeds the MTOW limitations. An aircraft delay would result and many dissatisfied passengers would be required to be removed from their planned flight.

The FAA has established guidelines through the issuance of an Advisory Circular AC No: 120-27E, dated Jun. 10, 2005, "Aircraft Weight And Balance Control"; in which an airline is allowed to determine aircraft weight through the adoption of a "weight and balance control program" for aircraft operated under Title 14 of the Code of Federal Regulations (14CFR) part 91, subparts 121, 125 and 135. Part 121 deals with scheduled air carrier operations, including airlines such as American, Delta, United and Southwest.

The aircraft operator will use approved loading schedules to document compliance with the certificated aircraft weight limitations contained in the aircraft manufacturer's Aircraft Flight Manual (AFM), for the compiling and summing of the weights of various aircraft equipment, fuel and payload weights, along with the AC120-27H weight designations for passengers and baggage. These types of loading schedules are commonly referred to as the Load Build-Up Method (LBUM).

The aircraft LBUM weight determinations are "computed" with the use of guidance from AC120-27E and considered by the FAA as being 100% accurate. The FAA accepts an aircraft weight which is established under an approved weight and balance control program, using the guidance from AC120-27B as to having zero error in the total aircraft weight; not even one pound of error.

AC120-27E defines approved methods to determine the aircraft weight using "weight assumptions" which are independent of any requirement to use scales to measure of the aircraft total weight at dispatch. The fully loaded weight of the aircraft is established through a process of compiling the weights of various payload items based upon FAA approved "designated" average weights, for the varying elements such as passengers, carry-on baggage, checked baggage, crew weight, cargo weight and the weight of fuel loaded; onto a previously measured empty aircraft weight. AC120-27E designates for large aircraft (being aircraft certified to carry more than 70 passengers) approved weight assumption/designation for passengers and baggage as:

| | |
|---|---:|
| passenger weight - May-October | 190.0 lb. |
| passenger weight - November-April | 195.0 lb. |
| checked bag weight | 28.9 lb. |
| checked as "heavy" bag weight | 58.7 lb. |

Historical weather patterns regarding wind velocity and direction, combined with anticipated storm events along scheduled airline routes are also considered when planning the amount of fuel to be consumed during the flight. On the actual day of a flight, typically two hours prior to the departure of that flight, the airline's automated load planning program will transfer this particular flight plan to the desktop computer display of one of the airline's Flight Dispatchers. It is the responsibility of the Flight Dispatcher to then monitor the planned load of this flight as passengers check-in and board the aircraft. The number of passengers and checked bags are input to the load-planning program. Typically this process goes without interruption and the aircraft will dispatch on schedule, as planned. As the aircraft's door closes and the load-plan is closed-out by the Flight Dispatcher, the aircraft weight associated with the "planned load" will always match the aircraft weight associated with the "departure load" as submitted to the FAA; because both are based on the same collection of weight assumptions used in determining the LBUM. Use of an alternate means to physically measure the total aircraft weight, just as the aircraft door closes, and the possibility of the measured aircraft weight not matching the calculated weight of the LBUM, would have the airline facing a potential departure delay, to resolve any difference in the two separate but parallel aircraft weight determinations. This potential for delay in the flight departure on as many as 2,500 daily flights for a single airline, results in the various airlines not willing to take the risk of hundreds of flight delays each day. Many if not most airlines currently dispatch their aircraft under FAA approved LBUM procedures; a method which helps to keep the airlines running on schedule. This also creates an incentive for airlines to continue to use the FAA approved assumed weights, irregardless to whether the assumed aircraft weight determinations are accurate.

Some airlines offer "assigned seating" within the cabin compartment for their passengers. This process not only allows the passenger the assurance that they will have the seat of their choosing, but also allows the airline load planners the knowledge of the exact location within the cabin as to where the weight associated with that passenger and their carry-on items is located. Airlines which do not offer the option of pre-assigned seating must entrust their load planning departments to determine aircraft CG, lacking the knowledge of where the passenger weights will be located within the aircraft cabin. If an aircraft operated with an open-seating policy has in excess of 80% of the seats filled with passengers, the weight distribution shall be assumed equally distributed throughout the cabin. If the same aircraft departs with only 30% of the seats occupied, the airline has no assurance as to where the weight is located throughout the cabin.

Herein are two examples to better illustrate § 121.695 subparagraph (d) mentioned above. The Boeing 737-800 aircraft has a seating configuration for 174 passengers, in which only 52 passengers (30%) were boarded onto the flight, and will be used in the following examples:

Example #1—an air carrier which operates with an "assigned seating" policy can position the 52 passengers (being just 30% of total) and their associate weight, distributed evenly throughout the aircraft cabin; thus assuring the cabin load remains within the forward and aft CG limits. With each passengers assigned a specific seat located within a specific row number, the airline can plan the aircraft load with confidence that the aircraft will be loaded within the aircraft CG limitations.

Example #2—an airline which has an "open seating" policy, there is a possibility that the 52 passengers may all select a seat within the forward section of the aircraft, in order to be seated forward of the aircraft wing and the engine noise associated with those seats located aft of the wing; and to further be able to quickly exit the aircraft upon arrival at their destination. In this scenario where all 52 passengers are seated within the forward ⅓ section of the aircraft, the aircraft CG has the potential of being positioned beyond the certified forward CG limit of the aircraft.

To insure the aircraft CG, as loaded in Example #2, remains within the CG limitations, the FAA will place additional operational restrictions, often called "curtailments" to the extreme forward and extreme aft sections of the manufacture's defined CG envelope. The airline which operates with these curtailments must take actions to insure the aircraft remains within these Regulatory Authority imposed "operationally curtailed" CG limitations through methods such as blocking-off the some of the forward and aft rows of the aircraft seating, or to possibly add temporary "ballast" (heavy bags filled with lead pellets) into the forward or aft cargo compartments of the aircraft, to assure these partially loaded flights will remain within the "operationally curtailed" CG limitations. A full description of these curtailments along with the new methods of this invention for relief of these curtailments will be explained later.

The positioning of passenger weight is important to the aircraft flight planning process. The Boeing 737-800 aircraft has an overall length of 129 feet 6 inches, from nose to tail. Considering an airline operation which has the full use of the CG limitations with no curtailments, at the reduced take-off weight of 150,820 lbs., the airline's load planner has but only 42 inches (see FIG. 1) to position the cabin and cargo compartment loading, from the originally aircraft's certified CG limitations. If the load planner fails to stay within the forward end of this 42-inch window, the CG 27 will be too far forward, where the aircraft may fail to properly rotate for take-off and a subsequent rejected take-off could over-run the length of the airport runway. If the load planner fails to stay within the aft end of the 42-inch window; the CG will be too far aft, where the aircraft may over-rotate at take-off resulting in a tail-strike, or transition into a stall where the aircraft could possibly crash.

Accurate determination of aircraft take-off weight is an important part of load planning in that it not only adds to the safety of each flight it also is an important consideration regarding the overall life limitation of the aircraft. The aircraft weight can be incorrect by as much as 2,000+ pounds and a "properly balanced" aircraft will still take-off, using and extra 100 feet of the available 10,000 feet of runway. The additional weight could come from a variety of possible mis-calculations, but typically will not affect the aircraft take-off.

An aircraft is typically supported by plural and in most cases three pressurized landing gear struts. The three landing gears are comprised of two identical main landing gear struts, which absorb landing loads, and a single nose landing gear strut used to balance and steer the aircraft as the aircraft taxis on the ground. Designs of landing gear incorporate moving components which absorb the impact force of landing. Moving components of an aircraft landing gear shock absorber are commonly vertical telescopic elements. The telescopic shock absorber of landing gear comprise internal fluids, both hydraulic fluid and compressed nitrogen gas, and function to absorb the vertical descent forces generated when the aircraft lands. While the aircraft is resting on the ground, the aircraft is "balanced" upon three pockets on compressed gas within the landing gear struts.

Monitoring the distribution and subsequent re-distribution of aircraft loads can be identified by measuring changes in the three landing gear strut internal pressures, which will in turn identify the aircraft CG. The implementation of changes to aircraft loading procedures for both the assumptions as to the weight of items loaded onto the aircraft, as well as the location within the aircraft the weights are placed, further combined with strict auditing procedures to identify non-recognized weight errors associated with the weight assumptions, create the justification basis to allow aircraft weight and CG limitations to be modified.

In spite of numerous variations in prior art for aircraft on-board weight and balance systems ("OBWBS"), no U.S. airlines currently use OBWBS in their daily operations, but instead all major airlines typically use the LBUM to determine aircraft weight.

This invention offers new methods with apparatus to "periodically" measure aircraft weight, in support of redefined load planning procedures and records-keeping, to create the justification basis for increases in the aircraft weight limitations and an easing of operational CG curtailments for Regulated aircraft.

Additionally, the creation of the justification basis for an increase to weight limitations for Regulated aircraft, to a higher weight limitation equivalent to the amount of the currently allowed statistical error in weight assumptions of the LBUM shall be fully described in the new methods of this invention for relief to weight limitations and CG curtailments and will be explained fully throughout the Figures and Descriptions herein.

It should be noted that the Regulatory Authorities have various practices to provide relief or modification to the regulatory requirements, such as:

Equivalent Level of Safety

Special Condition

Exemption

This relief is normally granted by the Regulatory Authority, after demonstration and/or analysis of an alternate means of compliance, which verifies compliance with the intent of the regulation, without showing literal compliance to the regulation.

Another aspect of this invention are methods by which Part 121 air carrier operations utilizing "random/open seating" polices are justified in receiving relief from operational CG curtailments caused by aircraft loading assumptions, to an equivalent of the broader CG curtailments of air carrier operations using "assigned seating" policies, whereby the operational CG limitations of a Part 25 aircraft may be increased and acknowledged by aviation Regulatory Authorities. One of the methods of this invention involves analysis of periodically obtained weight and/or CG data from daily airline operations, combined with development and implementation of set of new daily operational requirements for the Part 25 aircraft; thus providing by either: a demonstration and/or analysis to substantiate, a finding of an "Equivalent Level of Safety" and/or "Special Condition".

The FAA defines an Equivalent Level of Safety (ELOS) as follows: "Equivalent level of safety findings are made when literal compliance with a certification regulation cannot be shown and compensating factors exist which can be shown to provide an equivalent level of safety."

{http://rgl.faa.gov/Regulatory_and_Guidance_Library/rgELOS.nsf/}

The FAA issues a finding of ELOS during the process of certification, whether that be the initial certification of an aircraft, certifications of derivative aircraft the manufacturer may develop or when issuing a Supplemental Type Certificate for modifications to an aircraft type, developed by entities other than the manufacturer.

In the case of existing air carrier operations the "literal compliance" with an accurate determination of aircraft weight and CG, which cannot be shown, however the "compensating factors" which exist in this new invention to substantiate the ELOS finding include:

The incorporation of apparatus and methods to measure, periodically record and display (or generate alerts)

when defined weight and/or CG thresholds are exceeded and, one or more of the following additional elements:

The Approved Flight Manual for the aircraft contains specific operationally imposed weight and CG limits with which the aircraft must apply and provides for compliance with the traditional LBUM in determining aircraft total weight, if the ability of the system's periodic sampling of weight and CG becomes inoperative;

Apparatus and methods for periodically recording aircraft weight and/or CG for a specific sample size of aircraft dispatches in support of a trend monitoring system to monitor the "experienced" aircraft loading; as compared to both the specific load manifest of the periodically weighed aircraft and that of the loading pattern trends of the airline's full fleet of aircraft;

Alerting to the flight deck crew if the real-time sampled weight and/or CG has exceeded one or more predefined thresholds.

The FAA defines Special Condition as follows:

"A Special Condition is a rulemaking action that is specific to an aircraft type and often concerns the use of new technology that the Code of Federal Regulations does not yet address. Special Conditions are an integral part of the Certification Basis and give the manufacturer permission to build the aircraft, engine or propeller with additional capabilities not referred to in the regulations."

{http://rglfaa.gov/Regulatory_and_Guidance_Library/rgSC.nsf/}

A requirement for periodic sampling of physically measured aircraft dispatch weight and CG is not referred to in the regulations; therefore a pathway for Special Condition is created.

A Regulatory Authority may wish to approve such installation, use and regulatory relief from such a System, by the issuance of a Special Condition as an alternative to the granting approval established by an ELOS, based upon no regulatory requirement or definition of a System which measures aircraft take-off weight and CG. Regardless of the regulatory approval path used, the System attributes would be the same.

One of the methods of this invention comprises analysis of "statistically generated" random passenger weights with application of potential non-recognized errors in both the average passenger and average baggage weight data, to be further compared to the distinct 190 lb. weight designation to an additionally assumed 50% male/50% female passenger profile boarding onto the aircraft; further combined with development and implementation of set of new daily operational requirements for the Part 25 aircraft; thus providing by either: a demonstration and/or analysis to substantiate, a finding of an "Equivalent Level of Safety" and/or "Special Condition".

Though the FAA may continue to assume aircraft weight determinations, as computed within the guidance of AC120-27E, to have zero errors in the aircraft weight determination; a statistical evaluation and review of the FAA approved methods finds significant errors in the LBUM weights which remain un-recognized by the FAA. It will be the identification and quantification of these un-recognized weight errors and the ability to absorb these errors into and with the physical measurement of the aircraft weight, that will create a satisfactory justification basis for Regulatory Authorities to allow regulated aircraft to operate at an increased aircraft MTOW limitation; which increased weight limit is equivalent to the difference between the statistical errors of LBUM computed weight to that of the actual measured aircraft weight.

A common finding when physically re-weighing an aircraft to determine the Operating Empty Weight ("OEW") is that the weight of the empty aircraft never gets lighter, but tends to get heavier over the life of the aircraft. As aircraft age, the insulation within the cabin will retain higher amounts of moisture. Dirt will accumulate on lubricated surfaces; dirt will become embedded within the carpets and seat fabrics. Structural repairs, which consist of doubling-plates, riveted over discovered fuselage cracks, add weight to the aircraft. These weight increases will remain unrecognized for up to the 36 months interval between the aircraft 3-year re-weighing cycles. Some airlines utilize a practice of "fleet average" weighing, where a minimum of 6 aircraft plus an additional 10% of the operating fleet; i.e.: 56 of a 500 aircraft fleet will be physically re-weighed, where the remaining 444 aircraft will be assumed to have an identical averaged fleet-weight.

The scales used to determine the aircraft OEW are not required to maintain any FAA stipulated accuracy tolerance, other than an FAA requirement that the airline should calibrate the scale according to a scale calibration procedure approved by the scale manufacturer. Errors can often be as high as 0.5%.

To this point, the focus of this new invention has examined the aircraft MTOW limitation. MTOW is one of four aircraft weight limitations that are established in the flight's load planning process for a particular aircraft dispatch, as part of determining a specific aircraft weight limitation using the LBUM process of determining aircraft weight.

The methods described herein are applicable as procedures and practices used to obtain Regulatory Authority approval to amend existing aircraft weight calculation practices for determining other aircraft operating weights including: MRampW, MLW and MZFW. In today's airline operations, other aircraft weight determinations such as: MRampW, MLW and MZFW are all determined using the same foundations of the MTOW, as determined by LBUM computations.

The Maximum Ramp Weight ("MRampW") is the MTOW plus the weight of the fuel needed to operate the engines while the aircraft taxi along the airport's service ramps, prior to take-off.

The Maximum Landing Weight ("MLW") is maximum allowable weight at which the aircraft can "plan" to land. The MLW is the MTOW less the amount of weight associated the "planned" fuel consumption for the flight.

The Maximum Zero Fuel Weight ("MZFW") is the maximum amount of weight less any onboard fuel. The MZFW is used to determine limits as to passengers and payload, which are loaded onto an aircraft. MZFW is the MTOW less the amount of fuel within the aircraft's fuel tanks as measured by the aircraft cockpit fuel indicators.

The Boeing 737-800 is one of the most common commercial aircraft flown worldwide by today's airlines and shall be used as the example aircraft throughout the examples and illustrations in this invention.

SUMMARY OF THE INVENTION

A method obtains a change in certification weight limits of an aircraft model from a Regulatory Authority. The aircraft model comprises plural aircraft, each aircraft of the aircraft model capable of carrying a payload, the aircraft model having a first maximum weight limit. The method comprises, for an aircraft of the aircraft model near the first maximum weight limit, obtaining statistical data on the weight of the payload carried by the aircraft. The step of obtaining statistical data on the weight of the payload carried by the aircraft is repeated for a number of flights of aircraft of the aircraft model. For the same respective flights, computed data on the weight of the payload is obtained. For each flight, comparing the statistical data on payload weight to the computed data on payload weight and determining a weight error. Using the statistical weight data, the computed weight data and the weight error, obtaining certification from the Regulatory Authority for the aircraft model to operate within the amount of the weight error and above the first maximum weight limit.

In one aspect, the step of obtaining statistical data on the weight of the payload carried by the aircraft further comprises the step of using a random number generator to provide the payload weights, the random number generator using a predetermined mean and a predetermined standard deviation.

In another aspect, the step of obtaining statistical data on the weight of the payload carried by the aircraft further comprises the step of measuring the actual weights of the payloads.

In still another aspect, the step of obtaining computed data on the weight of the payload further comprises the step of using Regulatory Authority prescribed weights in a load build up method.

In still another aspect, the first maximum weight limit comprises a first maximum takeoff weight limit.

In still another aspect, the first maximum weight limit comprises a first maximum landing weight limit.

In still another aspect, the first maximum weight limit comprises a first maximum zero-fuel weight limit.

In still another aspect, the first maximum weight limit comprises a first maximum ramp weight limit.

In still another aspect, the method further comprising the step of determining when an aircraft of the aircraft model is near the first maximum weight limit by obtaining computed weight data for aircraft of the aircraft model.

A method plans for operations of an aircraft model so that individual aircraft of the aircraft model operate within acceptable maximum weight limitations. Aircraft of the aircraft model are operated and obtaining and using computed weights of the aircraft to operate the aircraft and ensure the aircraft is within the maximum weight limitations, the computed weights of the aircraft comprising assumptions of payload weights. Sampling the operations of the aircraft of the aircraft model by measuring the weight of at least some of the aircraft of the aircraft model. For the sampled operations, comparing the measured weights to the computed weights and determining a weight error. Using the weight error to modify the assumptions of payload weights and using the modified weight assumptions to determine improved computed weights of the aircraft in subsequent aircraft operations.

In one aspect, the assumptions of payload weights comprises passenger weights.

In another aspect, the assumptions of payload weights comprises baggage weights.

In still another aspect, the step of measuring the weight of at least some of the aircraft of the aircraft model further comprises the step of measuring the weight supported by landing gear of the aircraft.

A method operates an aircraft, the aircraft having a first maximum take-off weight limitation based upon Regulatory Authority certification limits. Before dispatching the aircraft for flight operations, determining a computed weight of the aircraft, the computed weight comprising assumptions as to weights of a payload on the aircraft. Identifying weight error in computed payload weights of the aircraft, the computed payload weights using assumed weights for payload. Determining that the computed weight of the aircraft is within the first maximum take-off limitation plus the weight error. Dispatching the aircraft if the computed weight of the aircraft is below the sum of the first maximum take-off limitation and the weight error, periodically obtaining the measured aircraft take-off weight through a weight verification reliability program database. Comparing the computed aircraft take-off weight to the measured aircraft take-off weight stored within the weight verification reliability program. Identifying from the measured aircraft weight, the non-recognized weight errors allowed by the computed aircraft take-off weight. Identifying the statistical error found in the compiled payload weight assumptions. Based upon use of measured aircraft take-off weight, operating the aircraft at a higher, second maximum take-off weight equivalent to some portion of the statistical error in the assumptions of the non-recognized weight.

In one aspect, the aircraft belongs to an aircraft model which aircraft model comprises substantially similar aircraft. The operations of the aircraft of the aircraft model are sampled by measuring the weight of at least some of the aircraft of the aircraft model. For the sampled operations, comparing the measured weights to the computed weights and verifying that the aircraft take-off weight is below the sum of the first maximum take-off limitation and the weight error.

In another aspect, further comprising the step of using the weight error to increase corresponding aircraft center-of-gravity limitations.

BRIEF DESCRIPTION OF THE DRAWINGS

Although the features of this invention, which are considered to be novel, am expressed in the appended claims, further details as to preferred practices and as to the further objects and features thereof may be most readily comprehended through reference to the following description when taken in connection with the accompanying drawings, wherein:

FIG. 4 is a chart illustrating a typical Load Build-Up Method "LBUM" used by airlines to determine total aircraft weight.

FIGS. 5a and 5b illustrate non-recognized weight errors through a comparison of a fully loaded Boeing 737-800 aircraft, with all 174 passengers assigned the Regulatory Authorities' designated weight of 190 pounds per person; to that of 174 statistically generated random passenger weights applied to all 174 seats within the aircraft.

FIG. 6 illustrates the non-recognized weight error of FIGS. 5a and 5b, with the addition of the Regulatory Authorities designated 5 pound per person in additional weight assumption, added to each passenger's weight, for assumed extra winter clothing; and adjusting the Male % to Female % distribution assumptions.

FIG. 7 illustrates a comparison of Regulatory Authorities' designated weights for personal items and carry-on baggage, with the FAA identified 16 lb. applied to each of the carry-on items. Further illustrating a 20% change in assumed allocation applied and assumed 15% error in item weight.

FIG. 8 illustrates an analysis of the Regulatory Authorities' designated checked baggage weight designations, distributed as the Regulatory Authorities' assumed: 33%—zero, 33%—one checked bag, and 33%—one checked bag and one heavy checked bag per passenger baggage allocation; with an assumed 20% error of 4.3 pound per checked bag and 8.8 pound per heavy checked bag error applied, and 20% error is assumed allocation applied.

FIG. 9 illustrates a calculation of the potential of a 2% error in the determination of the weight of the fuel onboard the aircraft, in that typical aircraft fuel weight indicators are allowed and error tolerance of 2%.

FIG. 10 illustrates a calculation of the potential of a 0.5% error in the determination of the empty aircraft weight, in that typical aircraft weighing scales allowed an error up to 0.5% of the measured aircraft weight.

FIG. 12 illustrates the methodology for obtaining Regulatory Authority Approval for the allowance to periodically measure aircraft weight in order to increase a Regulated aircraft's MTOW limitations.

DETAILED DESCRIPTION OF THE PREFERRED EMBODIMENT

Figure 1:
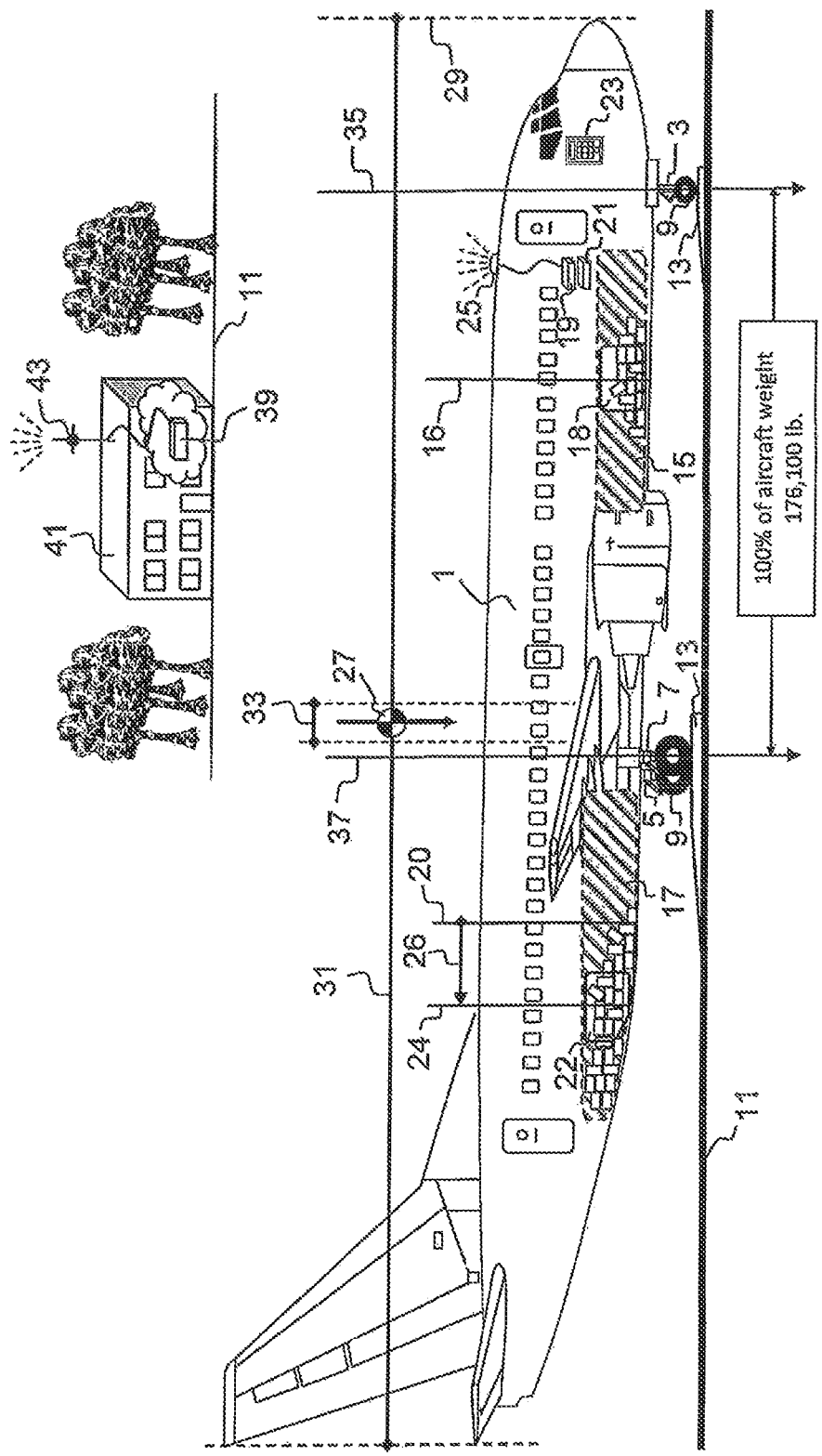
FIG. 1 is a side view of a typical Boeing 737-800 transport category aircraft, with various components of the invention including an on-aircraft computer and an off-aircraft computer residing in a separate building, along with nose and main landing gear of the aircraft deployed and resting on weight measuring ground scales.

The present invention provides methods to identify and quantify errors in aircraft weight determinations. Information regarding the errors is used in future aircraft operations to determine the aircraft weight with higher accuracy. Information regarding the errors is also used in future aircraft operations to allow an increase in maximum weight limitations. Such an increase in maximum weight limitations allows an aircraft to carry more payload and generate more revenue. In addition, increases in maximum weight limitations allow an aircraft to carry more fuel.

The present invention identifies errors in aircraft weight determinations by obtaining statistical data on the payloads of aircraft that are near a maximum weight limit. The statistical data is obtained from a number of actual aircraft operations that have already occurred. Examples of maximum weight limitations include maximum take-off weight and maximum landing weight.

The actual aircraft operations involve actual flights of aircraft. Such operations include dispatching the aircraft from a gate after passengers and cargo have been loaded, pushing the aircraft back from the gate, taxiing the aircraft, taking off, flying the aircraft to the next destination, landing the aircraft at the destination, taxiing the aircraft to the gate and discharging the passengers and cargo. In planning for an upcoming flight of an aircraft, an airline uses assumptions of weight of the passengers, baggage, fuel, etc. These weight assumptions are added to the weight of the empty aircraft and other items, such as food, beverage carts, etc. From this, the airline is able to determine a computed weight of the aircraft for the upcoming operation and flight. The aircraft is dispatched using the computed weight.

The present invention compares the computed weight of the actual aircraft operations to the statistical data on weight and determines the statistical error as well as the measured physical error in the weight. This weight error is then presented to the Regulatory Authority to obtain an increase in the certified maximum weight limitation. This weight error is also used by an airline to increase the accuracy of its computed weights, which computed weights are based on assumptions.

The present invention thus works within the current regulatory environment and enhances the operations of aircraft. Airlines can continue to use computed weights, based on weight assumptions, to plan future aircraft operations. Those same computed weights are used to dispatch the aircraft for operations. Airlines need not be concerned with delaying flight operations, such as gate departures, due to mismatches in weights.

Preferably, the comparison between statistical weights and computed weights occurs for aircraft that are full or near full, which is when the aircraft are at or near a maximum weight limitation. As the comparisons are performed after the flights or operations have occurred, a determination can be made that a particular aircraft operation utilizes a full or near full aircraft based upon computed weights.

The determinations are made by aircraft model because a Regulatory Authority certifies weight limitations a particular aircraft model for operation. A particular aircraft that is within that certified aircraft model is also certified. In other words, regarding weight limitations, a Regulatory Authority certifies not individual aircraft, but the aircraft within a particular aircraft model and sub-model. For example, a Boeing 737-800 is a particular 737 aircraft model with the −800 being a sub-model. Boeing has made and will make a number of aircraft that are within this aircraft model.

Payload includes passengers and baggage, whether the baggage is carried on by the passengers or checked and stowed in the cargo compartments of the aircraft. Payload also includes cargo, such as packages, mail, etc.

In the description herein, the disclosures and all other information of my earlier U.S. Pat. Nos. 5,214,586; 5,548,517; 6,128,951; 6,237,406 and 6,237,407 are incorporated by reference.

The present invention utilizes prior art methods to physically measure the weight of an aircraft as it rest on the ground. Parallel measurements of aircraft weight by independent weight sensing features allow for an increase in confidence of the physical weight measurements and further offer cross-verification for physical weight measurement system accuracy.

The present invention utilizes prior art methods to physically measure the Center of Gravity "CG" of an aircraft as it rest on the ground.

In today's airline operations, aircraft MTOW determinations are computed by a Load Build-Up Method, which processes and procedures have remained relatively un-changed for the past 50 years. The FAA has published Advisory Circular AC120-27E offering guidance for an approved method to determine the aircraft weight by "computations" which are independent of any requirement to measure of the weight of an aircraft fully loaded with passengers and/or cargo. The fully loaded weight of the aircraft is computed by a process of compiling the weights of various payload items based upon FAA "designated" average weights, for the varying elements such as passengers, carry-on baggage, checked baggage, crew weight; along with cargo weight and the weight of fuel loaded; onto a previously measured empty aircraft weight. This method of computing the aircraft weight based on the summing of the various weight elements loaded on to a pre-measured empty aircraft weight is often mentioned as the Load Build-Up Method and in this description shall continue to be referred to as the "LBUM".

The FAA's AC 120-27E designated weight assumptions/allocations for airline passengers and baggage are:

| | |
|---|---|
| Average passenger weight - summer | 190.0 lb. |
| Average passenger weight - winter | 195.0 lb. |
| Average bag weight | 28.9 lb. |
| Average heavy bag weight | 58.7 lb. |

On the actual day of a flight, typically two hours prior to the departure of that flight, the flight's automated load planning program will be transferred to the desktop computer display of one of the airline's Flight Dispatchers. It is the responsibility of the Flight Dispatcher to then monitor the planned load of that flight as passengers check-in at the gate. The number of passengers and allocations for checked bags are input to the load-planning program. Typically this process goes without interruption and the aircraft will dispatch on schedule, as planned. As the door of the aircraft is closed and the load-plan is closed-out by the Flight Dispatcher, the "planned load" will always match the "departure load" as submitted to the FAA; because both are based on the same compilation of weight assumptions used in determining the LBUM. Many if not most airlines currently dispatch their aircraft under FAA approved LBUM procedures; a method which helps to keep the airlines on schedule.

Throughout the description herein, examples will be shown for calculations to determine aircraft take-off weight, being a weight that must never exceed the aircraft's certified Maximum Take-Off Weight ("MTOW") limitations. Other aircraft weight limitations including MLW and MZFW are computed using a derivative the LBUM. Calculation of the "planned landing weight" is determined by subtracting the weight of the fuel, which is planned to be consumed during the flight from the determined aircraft take-off weight. Calculation of the zero-fuel weight is determined by subtracting the weight of the fuel within all fuel tanks, as indicated by the aircraft's fuel indicators, from the determined aircraft take-off weight.

Systems and/or components used and installed on Regulated aircraft are conformed and certified by the FAA and other Regulatory Authorities and typically have "design standards" which are stringent up to a factor of $10^{-9}$ and used in qualification. Ten to the minus $9^{th}$ ("$10^{-9}$") is the term typically used and has the equivalent of the odds for a failure of no more than one in one billion (1 in 1,000,000,000). When considering the chances or odds of an airline having non-recognized errors in their methods and procedures for determining aircraft take-off weight fall well below the $10^{-9}$ standards.

With many daily departures and the associated chances for some type of failure within the airline's LBUM system for determining aircraft weight, the illustration utilized (shown in FIG. 5b) simulates a random generation of 174 simulated passenger weights from a pool of 256,000 randomly generated passenger weights. The random passenger weights were created by the "Random Number Generation Tool" within the Analysis Tool Pack of the Microsoft Office Excel program; where 190 pounds was selected as the "Mean" (representing average weight), and 47 (representing pounds) was selected as the "Standard Deviation" where 265,000 random numbers (the maximum number allowed in the Excel program) are requested. The 265,000 randomly generated passenger weights will fill 174 seats within a total of only 1,471 flights. On any single day there is an average of 28,537 airline departures within the United States, http://www.ratca.org/mediacenter/bythenumbers.msp#1 thus the example (shown in FIG. 5b) is a random loading of only 1 in 1,471 flights; as opposed to 1 in 28,537 per day of airline flights; or even 1 in 1,000,000,000 being the $10^{-9}$ standard; is a conservative illustration of the potential for error.

The examples shown (in FIGS. 5a and 5b) illustrate and compare the statistical errors associated with the LBUM, without any consideration of the potential for human errors in mis-loading weight values into the LBUM algorithms, which would compound against the statistical errors, to increase the overall weight errors.

Use of a random number generation tool is one way to obtain statistical weight data. Other methods of obtaining statistical data can be used. For example, taking actual measurements of a sample population of airline passengers could be used. Still another way to obtain statistical data, as discussed below, is to obtain actual weight measurements from a sample of loaded aircraft.

An aircraft is typically supported by plural landing gear struts. In many if not most cases, aircraft are supported by three landing gear struts. Each landing gear strut is designed much like, and incorporates many of the features of a typical telescopic shock absorber. The shock absorber of the landing gear strut comprises internal fluids, of both hydraulic oil and compressed gas. More simply said . . . "the weight of an aircraft rests on three pockets of compressed gas."

As a point of clarification, throughout this description the use of the word "weight" can often be substituted with the use of the word "load" in that some airline operations will seek to avoid any possibility to allow the LBUM determined "take-off weight" of their aircraft be measured; thus referring to loads being applied onto the landing gear struts are often preferred.

The invention herein described will have some portion of all aircraft take-off weights measured as part of the defined processes and procedures to allow for an increase in the MTOW, MLW and MZFW limitations; while those airlines not wanting weight determination but instead desire only relief of CG curtailments will use the determination of "load distribution" features of this invention, without the continued calculations to determine the amount of measured aircraft weight supported.

The average population weight has been documented as becoming heavier year-after-year. For this reason, filled aircraft will (if measured) have a heavier measured weight than the weight computed by population weight data determined in the current FAA/AC120-27E, issued Jun. 10, 2005; which is in use today. Airlines throughout the United States are using this stale weight data in the current 28,537 aircraft dispatches per day.

By measurement of just the loads applied to each landing gear strut and thus transferred as pressure within each landing gear strut, with the further comparison of the load distribution between the combined main landing gear to that of the nose landing gear, the aircraft CG is established, without measuring the weight of the aircraft.

The weight of the aircraft supported by the above mentioned pockets of compressed gas is transferred down the landing gear strut to the landing gear axles, which bear the load and are supported by the landing gear tires. As weight is added to the aircraft, the axles will bend and deflect with the addition of more load. As an alternate means of determining aircraft weight, the bending/deflection of the aircraft landing gear axles can be monitored and measured with such axle deflection being directly proportional to the additional amount of weight added. The deflection of the landing gear axles represent the same load as supported by the pockets on compressed gas, thus both provide methods of determining aircraft weight, which may run parallel.

This invention provides methods of identifying, defining and illustrating a means of justification, for aviation Regulatory Authorities to allow for increases to the weight limitations for Regulated aircraft. The methods described herein develop various strategies including the building of a "justification basis" for increases to MRampW, MTOW, MLW and MZFW limitations; to higher weight limitations, which approved increased weight amounts are less than the amount of non-recognized weight errors in existing operations using the FAA approved guidance of AC120-27E.

Use of prior art aircraft weighing systems are implemented into a Regulatory Authority approved schedule to periodically make aircraft take-off weight measurements, along with unique methods and procedures for the review, analysis and documentation of non-recognizes weight errors, currently allowed in LBUM procedures; which will provide the necessary evidence for Regulatory Authorities' granting weight increases in amounts not exceeding the non-recognized weight errors being allowed today, through a Regulatory Authority's finding of an Equivalent Level Of Safety.

The methods of this new invention further develop strategies for new requirements, for implementation of operational procedures to assure Regulatory Authorities; that allowing the increase in MRampW, MTOW, MLW, and MZFW limitations for Regulated aircraft, will offer an Equivalent Level Of Safety, as an alternative means of Regulatory Compliance.

Regulatory Authorities do not require airlines to weigh aircraft to determine aircraft take-off weight, as a means to confirm aircraft weight limitations have not been exceeded. The procedures implemented in this invention for a defined schedule of pre-take-off aircraft weighings, facilitate the development of a new category of "reliability program" implemented to assure Regulatory Authorities that any increase in aircraft weight limitations shall not be abused nor exceed the non-recognized weight errors currently being allowed. Such periodic fully loaded aircraft take-off weighings will create a Superior Level of Safety, to that of aircraft currently operating with un-measured weights, which un-measured weights allow even further exceedance, beyond of certified weight limitations.

The present invention offers apparatus and methods utilizing a variety of sensors for collecting landing gear load data to continually update a variety of interrelated computer software programs, creating a more advanced aircraft weight measuring system.

To summarize this system, apparatus and methods used for continuous monitoring and measuring by various sensors include:
Strut pressure/temperature sensor
Landing gear strut axle deflection sensor
Aircraft inclinometer
On-aircraft computer to collect aircraft and landing gear data
Off-aircraft computer to process collected landing gear data, with software functionality to determine aircraft weight and CG
Wireless communication capabilities between on-aircraft computer and off-aircraft computer It is important for any aircraft weighing system to have the ability to accurately determine the aircraft weight before the departure from the gate.

This invention provides methods of identifying, defining and illustrating various means of justification for aviation Regulatory Authorities to allow for increases to the certified aircraft weight and operational CG limitations for Regulated aircraft. The methods described herein develop various strategies in the identification of non-recognized weight errors for a justification basis built upon the statistical demonstration of the long history of these non-recognized weight errors having created no un-safe aircraft operations for fully loaded/weighted aircraft, and to further construct an acceptable reliability program of safe aircraft operations with weight increases in Regulated aircraft weight limitations, equivalent to the non-recognized weight errors currently allowed today.

Airlines welcome any opportunity to increase the payload capabilities of their aircraft, considering the opportunity to increase the MTOW and associated MLW and MZFW limitation by up to 5,960 pounds and 3.4% of the MTOW (shown in FIG. 10); through the use the today's aircraft weight measuring systems, to more accurately determine the total aircraft weight.

In the preferred embodiment, the method for obtaining a Regulatory Authorities' approval for an increase in the aircraft MTOW and associated MRampW, MLW and MZFW limitations includes the following steps;

1. Record daily determinations of the total "computed" weight of the aircraft using existing weight determination procedures provided in the LBUM process (for example, shown in FIG. 4);
2. Periodically determine the total "measured" weight of the aircraft using an OBWBS (for example, refer to U.S. Pat. No. 5,214,586—Aircraft Weight and Center of Gravity Indicator; or U.S. Pat. No. 5,548,517—Aircraft Weight and Center of Gravity Indicator); or other suitable means to measure aircraft weight and CG;
3. Develop an aircraft "Weight and CG Reliability Program" utilizing the following steps:
   a. Measure the aircraft take-off weight and CG with a periodic weighing frequency acceptable to Regulatory Authorities,
   b. Compare the periodically measured aircraft take-off weight and CG to corresponding LBUM take-off weight and CG computations,
   c. Develop a data-base of identified trends in the differences in weight amounts and differences in CG locations,
   d. Utilize the measured weight and CG data, compared to the LBUM weight and CG data, to establish the amounts for weight adjustments to be incorporated into the airline's LBUM passenger and bag weight assumptions,
    i. The FAA, through AC120-27E guidance, allows for airlines to adjust the weight allocations for passenger and bags; with evidence the revised weights are more accurate.
  e. Over a defined period of time, being acceptable to Regulatory Authorities (i.e.: days, weeks or months), apply the adjustments to passenger and baggage weight assumptions, to improve the LBUM weight and CG determinations, and using the new assumed weight assumptions align the computed aircraft weight with the measured aircraft weight.
    i. Comparison of measured aircraft CG to that of LBUM determined aircraft CG will aid in determining the amount of change designated for the bag weight assumptions, in that individual "assumed bag weights" are tracked in the positioning of those bags within the forward and aft baggage compartments, and non-recognized errors in bag weight will become recognized through monitoring of the aircraft CG.
  f. Upon analysis of measured weight and CG data compared to LBUM weight and CG data, and gaining assurances that the LBUM weight and CG assumptions have been sufficiently modified to reflect what would be an equivalent measured weight and CG; increase the aircraft MTOW, MLW and MZFW limitations in an amount no greater than the total of the illustrated non-recognized weight errors, less an amount equivalent to the accuracy tolerance for the OBWBS used to measure aircraft weight and CC, or other means used to measured aircraft weight.
4. Create a look-up table within the OBWBS computer to compile a data-base of any future amounts of non-recognized weight transported, by continual comparison of measured aircraft weight to LBUM determined weight, to promote assurances that the Regulated aircraft have safely flown and continue to safely fly at weights which have been increased to a higher certified MTOW limitation.

A question still remains; "Why not just use measured aircraft weight and CG for every dispatch?"

As previously mentioned; "As good as an OBWBS might be for measuring the aircraft weight, such a system cannot plan the aircraft load." Airlines attempt to avoid any situation where a discovered discrepancy in the aircraft weight or CG, identified by use of a measured aircraft weight, might result in a schedule delay. Thus the development of a "Weight and CG Reliability Program" to allow Regulatory Authority's the assurance that the aircraft is being operated as safe as the aircraft has historically been operated while transporting the non-recognized weight errors; and with increase MTOW equivalent to the non-recognized errors historically allowed, will allow for the airline to proportionally increase the weight transportation capabilities of their aircraft.

Regulatory Authorities may choose to limit the amount of MTOW increase, to allow only some smaller percentage of the non-recognized weight errors, when airlines are using the "Weight and CG Reliability Program." Airlines may consider the additional benefits of having the full percentage of non-recognized weight errors added to the MTOW if they immediately begin using measured weights and CG to dispatch their aircraft, and deal with any potential schedule disruptions if the measured aircraft weight is found greater than the increased MTOW limitation.

Though any of the methods herein described may be used, with potential variations in overall accuracy of the weight determination; the preferred method is to use OBWBS to determine weight supported at each landing gear strut.

The methods described herein are applicable as procedures and practices used to obtain Regulatory Authority approval to amend existing aircraft weight calculation practices tor determining varieties of aircraft weights including: MRampW, MTOW, MLW and MZFW. Referring now to the drawings, wherein like reference numerals designate corresponding parts throughout the several views and more particularly to FIG. 1 there is shown a side view of a typical Boeing 737-800 transport category "Part 25" aircraft 1, supported by tricycle landing gear configuration consisting of a nose landing gear 3, and two identical main landing gears, including a left main landing gear 5 and a right main landing gear 7 (both main landing gear positioned at the same location longitudinally along the aircraft, but shown in perspective view for this illustration).

Landing gears 3, 5 and 7 distribute the weight of aircraft through tires 9, which in this illustration rest atop of platform weighing scales 13, with platform weighing scales 13 resting on the ground 11. Each of scales 13 measure a portion of aircraft 1 weight, supported at each respective landing gear, and with the three scale 13 weight measurements added together, they identify the total weight of aircraft 1, which in this example is 176,100 lbs., being 1,900 lbs. (or 1.09% of MTOW) in excess of the certified MTOW of 174,200 lbs. for this Boeing 737-800 aircraft. Aircraft 1 has a forward baggage compartment 15 and an aft baggage compartment 17.

Figure 2:
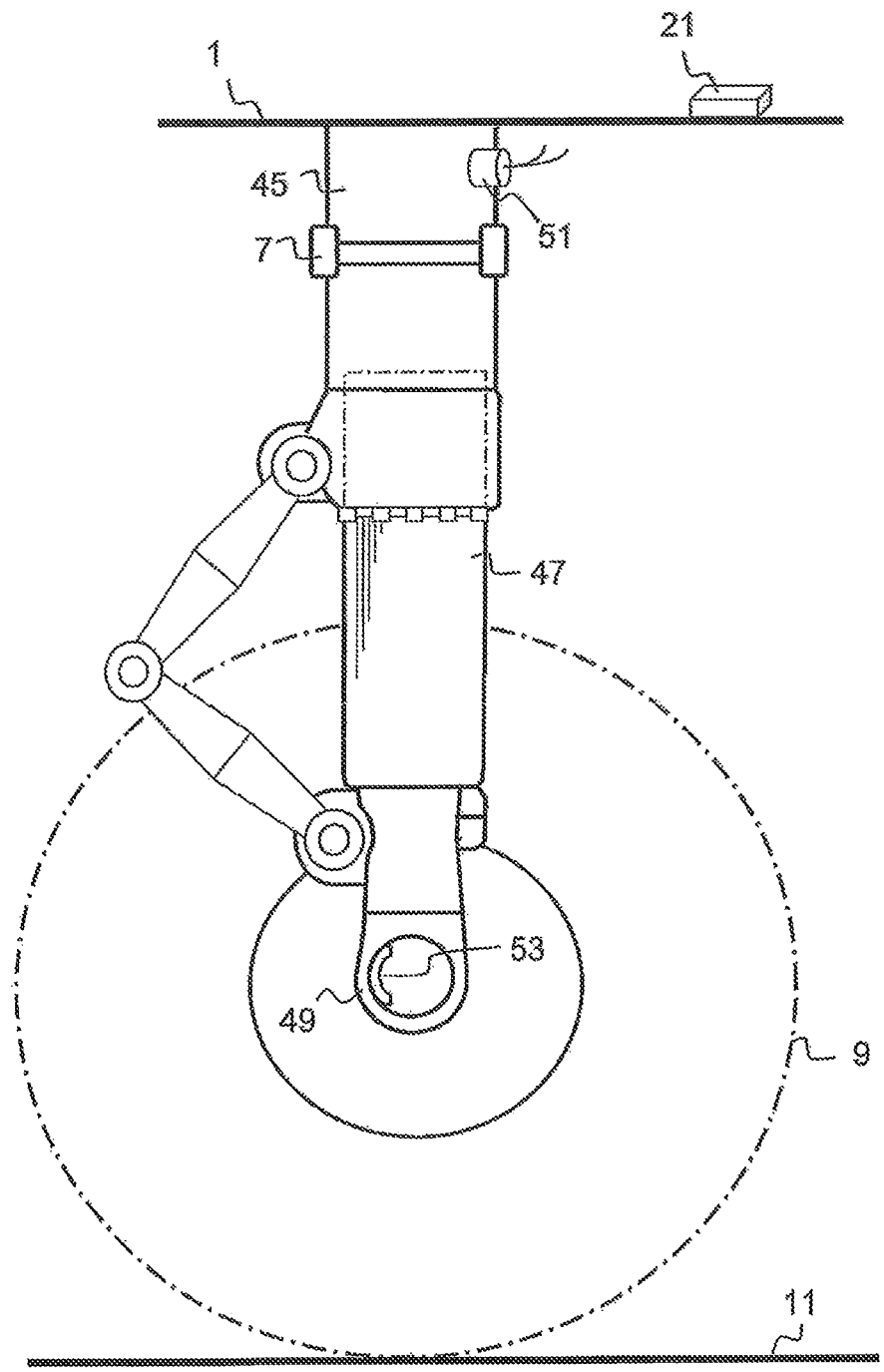
FIG. 2 is a side view of a typical aircraft landing gear strut, with various elements of the invention attached to the landing gear strut.
Figure 3:
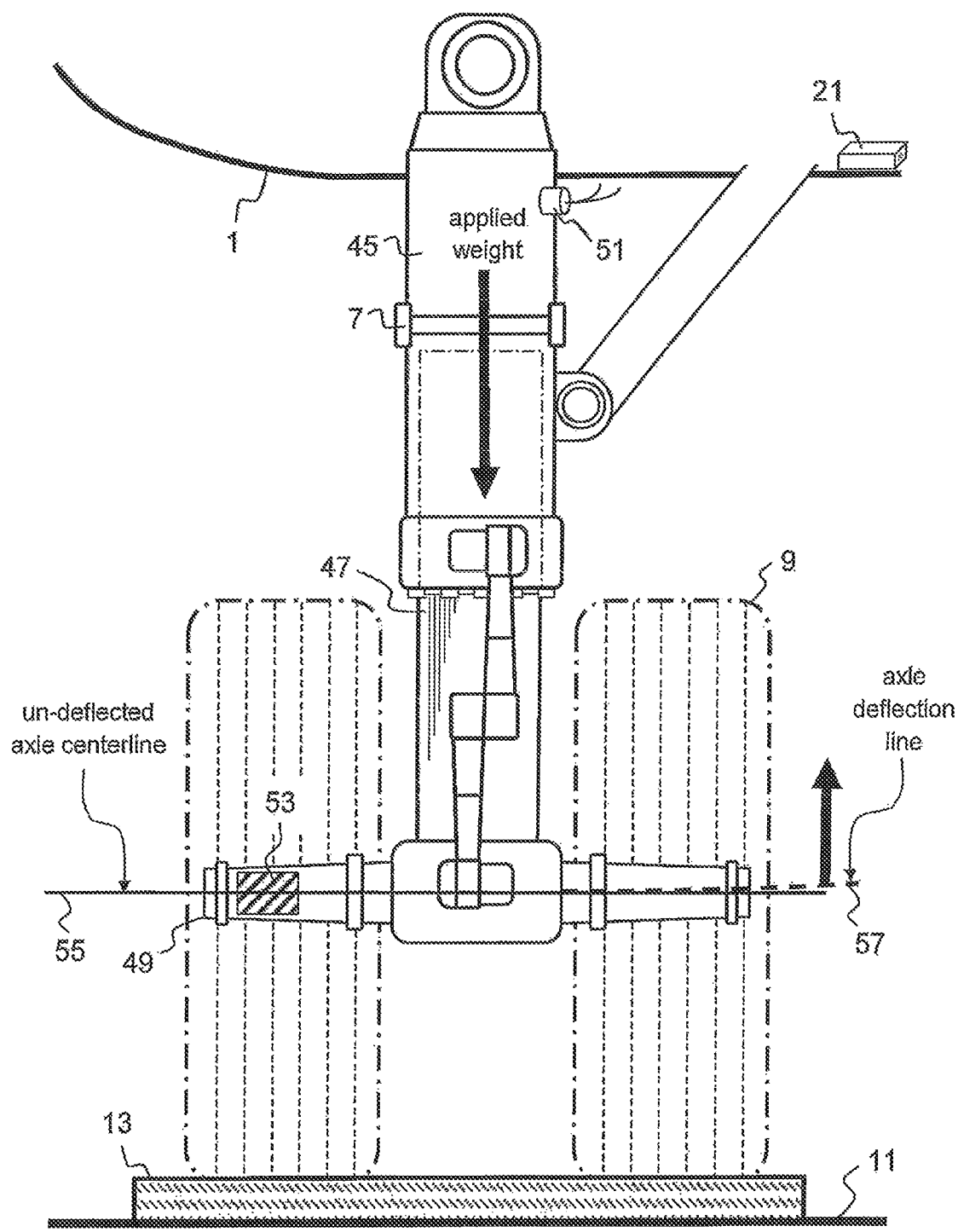
FIG. 3 is a front view of a typical aircraft landing gear strut with additional elements of the invention attached to the landing gear strut.

Electronic elements which are used in this invention, and are attached to aircraft 1, are an on-aircraft data acquisition computer 19, aircraft inclinometer 21 to correct measured aircraft angle of inclination to that being level with the horizon, cockpit display/keypad 23 allowing pilots a means to read on-aircraft computer 19 information and allow pilots to input data into on-aircraft computer 19, landing gear strut pressure sensors 51 and landing gear axle deflection strain gauge sensors 53 (shown in FIG. 2 and FIG. 3). On-aircraft computer 19 contains various internal circuit boards for the collection of strut pressure/temperature data and axle deflection data from respective landing gears 3, 5 and 7.

On-aircraft computer 19 is capable of wireless communication with a corresponding off-aircraft computer 39 which is located within a building 41. Off-aircraft computer 39 has no aircraft or landing gear sensor inputs. Off-aircraft computer 39 receives sensor input data recorded by on-aircraft computer 19 via wireless communications. Regulatory Authority's certification of software is required within any computer permanently attached to the aircraft 1. Use of on-aircraft computer 19 to only measure and record sensor data, and make no sophisticated calculations or computations; to then subsequently and wirelessly transmit only the recorded and date/stamped sensor data to off-aircraft computer 39 which does not reside on aircraft 1, can allow for a significant reduction in the system's software certification costs associated with providing airlines with this information. As an example: aircraft On-Board Weight and Balance Systems ("OBWBS") require Regulatory Authority certification for any internal software. Ground based computers that determine the same aircraft weight and balance information require far less stringent levels of software certification.

100% of the weight of the aircraft rests upon the combined left and right main landing gears 5, 7 and nose landing gear 3. The aircraft Center of Gravity ("CG") 27 can be determined by the comparing the measured weight (or if weight measurements are to be avoided, measured load as identified by strut pressure or axle deflection) supported by the combined main landing gears 5, 7 to that of the measured weight supported by the nose landing gear 3. As the percentage of the weight supported by nose landing gear 3 changes in relation to the weight supported by the combined main landing gears 5, 7 so does the location of the aircraft CG 27. (in FIG. 1, the CG is shown above the aircraft for illustrative purposes.)

Vertical dotted line 29 illustrates the forward end of aircraft 1. Horizontal line 31 illustrates the length on aircraft 1 being 1,554 inches long.

Downward pointing vertical arrow 35 illustrates the location for weight of aircraft 1, supported by the nose landing gear 3. Downward pointing vertical arrow 37 illustrates the location for weight of aircraft 1, supported by the combined left main 5 and right main 7 landing gears.

The accurate determination of aircraft 1 CG 27 is a critical process in the load planning for aircraft 1. Though aircraft 1 is 1,554 inches in length as shown by horizontal line 31, the forward and aft limits of the operational center-of-gravity envelope are only 42 inches apart, as illustrated by horizontal line 33. With just 42-inches of allowable certified center-of-gravity envelope, airline dispatchers must take great care in determining the amount and specific location of weight loaded onto aircraft 1.

Typical LBUM loading computations assume all of the bags are loaded and evenly distributed throughout baggage compartment as shown in forward baggage compartment 15. The assumed even distribution of the bags results in the total assumed weight of bags located at the geographic center of forward baggage compartment 15, shown as vertical line 16. The Boeing 737-800 aircraft forward baggage compartment 15 is twenty-five feet in total length, with the forward compartment door 18 located at the center of the compartment 15. The aft baggage compartment 17 is thirty-six feet in length, with the geographic center of aft compartment 17, shown as vertical line 20. Aft baggage compartment door 22 is located near the rear of the aft compartment 17. In this illustration forward baggage compartment 15 has an even distribution of bags, where the assumed weight is assigned to the location at the center of the compartment, as illustrated by vertical line 16. Aft baggage compartment 17 has the concentration of checked bags located in the aft portion of baggage compartment 17, shown by vertical line 24. The LBUM loading computation will not recognize this difference in the location of weight associated with the aft positioned bags in compartment 17, and its non-recognized shift in aircraft CG 27 further aft, as shown by "aft-shift arrow 26". Both forward and aft baggage compartment are equipped with restraining nets that hold the bags in place, to avoid the bags sliding as the aircraft 1 takes-off. This non-recognized aft loading of the bags could have the aircraft CG 27 located beyond the aft center-of-gravity limit, creating a scenario where the aircraft is too tail heavy in which the aircraft could over-rotate at take-off, then stall and possibly crash. Measured aircraft CG 27 allows for a Superior Level of Safety, in comparison to the approved methods for determining CC 27 today.

Although the weight of aircraft 1 is shown measured on platform weighing scales 13, the weight of the aircraft can be measured by a variety of OBWBSs (as shown in FIG. 2 and FIG. 3).

Referring now to FIG. 2 which illustrates apparatus for an OBWBS used as a method to measure aircraft 1 weight, where there is shown a side view of a typical aircraft telescopic right main landing gear strut 7, comprising the landing gear strut cylinder 45, in which strut piston 47 moves telescopically within strut cylinder 45. Pressure within landing gear 7 is monitored by a pressure sensor 51. All weight supported by tire 9 is transferred through axle 49, to piston 47; resulting in variations to landing gear strut 7 internal pressure, as recorded by pressure sensor 51. As weight is applied to landing gear strut 7, telescopic piston 47 will recede into strut cylinder 45, reducing the interior volume within landing gear strut 7 and increasing internal pressure in proportion to the amount of additional weight applied. Pressure sensor 51 will measure changes of strut pressure. With corrections made for pressure errors caused by landing gear strut seal friction, landing gear strut 7 functions as an equivalent to aircraft weighing scale 13 (shown in FIG. 1), but; with the capability of folding up and moving with the aircraft 1. As weight is added to landing gear strut 7 axle 49 will deflect in direct proportion to the amount of added weight. Deflection of axle 49 (shown in FIG. 3) is measured by strain gauge sensor 53.

Referring now to FIG. 3 which illustrates an alternate view of the apparatus for an OBWBS used as a method to measure aircraft 1 weight, where there is shown a front view of a typical aircraft telescopic main landing gear strut 7 comprising landing gear strut cylinder 45, in which strut piston 47 moves telescopically within strut cylinder 45. Landing gear strut piston 47 attached to an axle 49 which uses a wheel and tire 9 to transfer aircraft weight to the ground 11. Pressure within landing gear 7 is monitored by a pressure sensor 51. Pressure measured by pressure sensor 51 is proportional to the amount of applied weight onto landing gear 7. The applied weight to landing gear 7 is also measured by axle deflection sensor 53, which is bonded to axle 49. Axle deflection sensor 53 can be of the strain gauge variety, which measures the vertical deflection of axle 49. A bold solid line 55 is shown running horizontal across the centerline of landing gear axle 49 and represents an un-deflected stance of the landing gear axle 49. As additional weight is applied the landing gear strut 7, axle 49 will deflect. A bold dashed-line 57 illustrates a very slight curve; representing vertical deflection from solid line 55 of axle 49 and is shown running adjacent to the un-deflected bold solid line 55. The amount of deflection of landing gear axle 49 is directly proportional to the amount of weight applied. As weight is applied to landing gear strut 7, the increase in weight will be Immediately sensed by the additional deflection of axle 49 and measured by strain gauge sensor 53. In this illustration, scale 13 is placed between tires 9 and ground 14. The associated weight of aircraft 1 supported by landing gear strut 7 is measured by scale 13. The weight measurement of scale 13 corresponds directly with the measured deflection of axle 49 by axle deflection sensor 53.

Axle deflection sensor 53 will transmit a signal representing the weight applied to the landing gear strut 7, to the system on-aircraft computer 19 (shown in FIG. 1). As weight is added to landing gear strut 7 axle 49 will deflect in direct proportion to the amount of added weight.

Referring now to FIG. 4 there is shown a chart listing various weight categories for which airlines typically use to determine the total weight of an aircraft before flight. This practice is commonly called the Load Build-Up Method "LBUM". The aircraft selected for the example is the Boeing 737-800. The example chart in this FIG. 4 is divided into eight columns with each column number 1-8 shown at the top of each column.

Column 1 represents the Operating Empty Weight "QEW" of the aircraft. The OEW is the weight of the empty aircraft. One method to measure the empty weight of the aircraft is to roll the aircraft onto three platform-weighing scales 13, with one landing gear resting on each of the scales. Each scale measures the weight supported by each respective landing gear and the weights are added together to measure the aircraft total weight (shown in FIG. 1). An alternate method to measure the empty weight of an aircraft is to place it onto tripod floor-jacks, then lift the entire aircraft up and off of the hanger floor. A load-cell is located at the top of each floor-jack; so that once the aircraft is suspended above the floor, the weight of the aircraft rests on the three load-cells (this method is not shown). The OEW is then measured and the aircraft CG is further determined from the measured aircraft weights. Though the term OEW identifies the aircraft as empty, the aircraft is empty of fuel, payload and crew. Other items such as engine and systems hydraulic fluid, in-flight magazines, galley items such as coffee-makers and other lavatory items are considered part of, and are included in the OEW. In this example, the OEW of the Boeing 737-800 aircraft is 91,108 lbs. Aircraft are reweighed on a periodic basis to account for changes in OEW.

Column 2 represents the weight of the fuel which is carried within the aircraft fuel tanks. In the determination of aircraft weight, the fuel weight is determined by recording aircraft fuel indicator readings. Fuel is pumped onto the aircraft through flow-meters which measure the volume of fuel flow in gallons, and the aircraft fuel tank system has an indicator which converts the volume of fuel contained within each tank into a quantity indicated as pounds. The typical conversion rate is 6.8 pounds per gallon of fuel. In this example 6,000 gallons of fuel are contained within the fuel tanks, totaling 40,800 lbs.

Column 3 represents the weight associated with the food, beverages and other catering items planned for consumption during the flight. Airlines typically use catering carts which are pre-loaded with food, beverages and ice, prior to being loaded onto the aircraft. There are several types of catering carts; either a lighter cart filled with trays of food, or a heavier cart filled with canned soda beverages and ice. Each respective cart has a standard weight assigned to it based on the size and capacity of the cart. In this example, three of the heavier 128 lb. beverage carts are loaded onto the aircraft, totaling 384 lbs.

Column 4 represents the weight of the flight crew. The airline flight crew weights are divided into two categories: pilot-crew and cabin-crew. FAA regulations regarding assumed/assigned/designated weight values used in the LBUM are contained within FAA Advisory Circular—AC120-27E. AC120-20E designates a weight for each pilot at 240 lbs. The pilot is assumed to be carrying personal baggage and additional flight charts and aircraft manuals onto the aircraft. FAA regulations require 2 pilots (including a co-pilot) for this FAA Part 25 category of aircraft. FAA Regulations require one flight attendant for each block of 50 passengers, for which the aircraft is certified to carry. AC120-27E designates a weight for each cabin attendants at 210 lb., which includes personal baggage. The Boeing 737-800 aircraft is certified to carry a maximum of 174 passengers, thus the weight of 4 cabin attendants for this size of aircraft is applied. Combined pilot and cabin attendant weights total 1,320 lbs.

Column 5 represents the "measured weight" of the cargo loaded. Each of the 6 respective cargo items for this example flight is pre-weighed on scales prior to being loaded onto the aircraft. The cargo weight for this example flight totals 750 lbs.

Column 6 represents the weight of the checked bags (those bags which are loaded into the baggage compartments located below the aircraft cabin floor). AC120-27E designates weight values for two types of checked bags, depending on the assumed size of each bag. Smaller bag weights are assigned at 28.9 lbs. each. Larger bag weights are assigned at 58.7 lbs. each. For this flight there are 116 small bags totaling 3,352 lbs., plus an additional 58 large bags totaling 3,405 lbs., for a combined checked bag weight total of 6,757 lbs.

Colum 7 represents the weight of 174 passengers for this flight. AC120-27E designates weight values for average passenger weights at 190 lb. for summer weights and 195 lbs. for winter weights. It is assumed that during colder months, passengers will include more clothing as they board the aircraft. The summer average passenger weight of 190 lbs. is used between May $1^{st}$-October $31^{st}$ and winter weight of 195 lbs. is used between: November $1^{st}$-April $30^{th}$. With this example, the lower 190 lbs. summer weight assumption is being used. The passenger weight includes carry-on items. Such carry-on items include bags, purses, small luggage, backpacks, etc. With all tickets passenger boarding the aircraft, the weight of 174 passengers total 33,060 lbs. (shown in box 59).

Column 8 represents the computed total weight of the aircraft. Summing the totals along the bottom of columns 1-7 equals a 174,179 lbs. determination for the aircraft total weight (shown in box 61). Typical airline operations round-up the weight determination to the nearest 100 lbs. increment. The 174,179 lbs. accumulation is increased to 174,200 lbs. of aircraft total weight as determined by the LBUM; which also happens to be the MTOW limit for this Boeing 737-800 aircraft.

In the United States of America, the FAA is the Regulatory Authority that approves the designated weights. In other countries or regions, other Regulatory Authorities may have jurisdiction.

Referring now to FIG. 5a, there is shown an illustration of a passenger weight build-up chart illustrating the passenger weight distribution for a fully loaded Boeing 737-800 aircraft. The Boeing 737-800 aircraft is a typical narrow-body aircraft. The aircraft cabin is configured to carry a maximum of 174 passengers within a single economy class cabin having 6-across seating shown as seats in columns A, B, C, D, E and F. There are 29 equally spaced rows; shown vertically on the left side of the chart identified as Aircraft Row #1-29.

Regulatory Authority guidance found in AC120-27E shows the average passenger weight has been established from the National Health and Nutrition Examination Survey (NHANES) conducted by the Centers for Disease Control (CDC) in 1999. The NHANES data conducted actual scale weighings of approximately 9,000 subjects. The standard deviation for NHANES survey was 47 lbs. (this value will be used again to generate thousands of randomly selected passenger weights). The NHANES survey data concluded the population with a "mean" average weight for males as 184 lbs. plus 16 lbs. of additional weight was added for carry-on items totaling 200 lbs. The average weight for females was determined at 163 lbs. plus 16 lbs. of additional weight was added for carry-on items.

In this example illustrates a full flight, where all available seats have been allocated to passengers with an AC120-27E designated average passenger weight of 190 pounds per person, including carry-on baggage. The 190 lbs. passenger weight assumes 50% of the passengers are male and 50% of the passengers are female. The computation for the total passenger weight is the simple equation of 190 lbs.×174=33,060.00 lbs. (shown in box 59).

Referring now to FIG. 5b, there is shown an alternate illustration of the passenger weight build-up chart of FIG. 5a; but instead of 190 lbs. being assigned to each seat; randomly generated passenger weights are assigned to each of the 174 seats. The random generation of 174 simulated passenger weights can been established from a pool of 256,000 randomly generated passenger weights through the "Random Number Generation Tool" within the Analysis Tool Pack of the Microsoft Office Excel program; where 190 pounds was chosen as the "Mean" (representing average weight), and 47 (representing pounds) was designated as the "Standard Deviation" and 265,000 random numbers (the maximum number allowed in the Excel program) are requested. From the 265,000 randomly generated numbers, the initial block of numbers containing the first 174 values was selected and assigned to the 174 seats of the Boeing 737-800 used in the chart model for this example. The total passenger weight value from the random passenger weight totaled 34,081.93 (shown in box 65). Analysis of the 174 random passenger weights found in this initial block of random weights, the average weight was 195.87 lbs. (shown in box 63). Multiplying the additional 5.87 lbs. weight error tines the 174 filled seats, finds a total non-recognized weight error of 1,021.93 lbs. (shown in box 67).

Referring now to FIG. 6 there is again shown the non-recognized weight error of 1,021.93 lbs. associated with random passenger weights, (shown in box 67). An additional non-recognized error of 870.00 lbs. (shown in box 69) takes into account an additional 5 lbs. of winter clothing weight for the passengers on an October 15$^{th}$, 6:00 am departure from an airport in Chicago, Ill.; with a morning temperature of 36° where AC120-27E assumes since the November 1$^{st}$ calendar date has yet to arrive all of the 174 passengers are still wearing summer clothing. The Regulatory Authorities will assign the additional 5 lbs. per person for winter clothing weight, but only 2 weeks later than this flight departed, with the substantial weight error.

Regulatory Authorities make another assumption that within each of the 28,537 daily departures, the passenger distribution between male/female will always be 50% male and 50% female. If the distribution varies whereby 73% of the passengers are male and an additional 40 male passengers are 21 lbs. heavier along with the corresponding reduction of 40 female passengers which are 21 lbs. lighter; the non-recognized weight error will increase by an additional 1,680 lbs. (shown in box 71).

Beginning with this FIG. 6 and continuing through FIG. 10 there will be shown a variation of "box 73a through 73e" illustrating the cumulative effects of the non-recognized errors applied as the weight of the aircraft increases.

Box 73a illustrates the cumulative non-recognized weight error totaling 3,571.93 lbs.

Referring now to FIG. 7, where in 1999 the NHANES conducted weight surveys, supporting AC120-27E being the Regulatory guidance for passenger and baggage weight allocations in loading aircraft. Since 1999 there have been significant advancement in designs for roll-aboard hand-luggage which are now specifically designed to fit snuggly inside the over-head storage compartments within the passenger cabin, and are commonly used as carry-on items and not recognized as luggage. These roll-aboard bags, which are simply a slightly smaller version of typical checked baggage, allow many passengers the convenience of not having to wait for off-loaded checked-bags at the baggage claim departments. These recent trends are allowing more non-recognized weight to be transported within the passenger cabin of the aircraft. Recent airline practices of charging for checked bags have shifted more weight into the "free of charge" carry-on bags, which passengers will pack heavier and carry into the passenger compartment. New designs for the roll-aboard luggage have typical internal dimensions of 22"×15"×9" allowing 1.72 cubic feet of volume within each bag. An independent test was performed employing ten separate attempts to pack assorted clothing items into the 1.72 cubic feet of the roll-aboard bag, to find variations in the measured bag weights which ranged from a low of 15.6 lbs to a high of 24.7 lbs. The high weight error found in the tests deviated 54.38% above the mean carry-on bag weight of 16 lbs.

This FIG. 7 illustrates the Regulatory Authorities' prescribed weight of 16 lbs. for personal items and carry-on baggage, applied with AC120-27E assumptions of: ⅓, ½, ⅓ split for passengers carrying 0, 1, or 2 items. The determined weight for carry-on items totals 2,783.7 lbs. (shown in box 75).

A further comparison was made to today's more typical aircraft boardings with only 20% of the passengers boarding the aircraft with their hands empty, and 40% boarding while carrying only one item, plus an assumed 15% deviation applied to the FAA identified 16 lbs. weight allocation for the carry-on items. The conclusions found in this illustration a potential carry-on weight up to 3,841.7 lbs. (shown in box 77). A comparison of the carry-on bag weight assumption in box 75 to the potential carry-on weight value in box 77 illustrates an additional 1,058.0 lbs. for non-recognized weight error (shown in box 79).

Box 73b illustrates the cumulative non-recognized weight error increasing to 4,629.8 lbs.

Referring now to FIG. 8 there is shown a comparison of the of the Regulatory Authorities' checked baggage weight designations for both standard bag weight and heavy bag weight for the fully loaded, 174 passenger Boeing 737-800 flight. Checked baggage distribution is applied according to the guidance of Regulatory Authorities' AC120-27E and applied with the following per passenger assumptions: 33%—zero bags, 33%—one checked bag, and 33% one checked bag and one heavy checked bag totaling 6,756.3 lbs. (shown in box 81) compared to the same per passenger bag allocation. Data obtained from a large domestic airline operating a fleet of Boeing 737 aircraft finds passengers checking 1.2 bags per person, compared to the FAA assumed 174 bags for 174 passengers. With this applied 20% increase in number of checked bags, the application of the 20% bag weight error increased the checked baggage total weight by 1,351.3 lbs. (shown in box 85) to a total checked baggage weight of 8,107.6 lbs. (shown in box 83).

Box 73c illustrates the cumulative non-recognized weight error increasing to 5,981.0 lbs.

Referring now to FIG. 9 there is shown a calculation for the weight of the fuel required for the planned flight. The Boeing 737-800 used in the example has fuel capacity of 6,875 gallons. Typical aircraft fuel indicators measure the volume of fuel pumped into the fuel tanks with flow-meters, then use 6.8 lbs. per gallon as the conversion rate for the final weight determination. A measure volume within a gallon of jet-fuel will change with changes in temperature. On a warm day, a gallon of fuel will expand thus the gallon will weigh less than a gallon of fuel which has contracted on a cold day. Typical aircraft fuel indicators have an accuracy tolerance of ±2.0%. Though the fuel indicators are not required to have zero error, the Regulatory Authorities allow the fuel indicator weight determinations to be used without any requirement for the consideration of possible errors in the fuel weight. For this example 6,000 pounds of fuel was required for the planned flight. The conversion to pounds determined 40,800 lbs. of fuel. Applying the potential of a 2.0% fuel indicator error, the non-recognized weight error for the fuel is as high as 816.0 lbs. (shown in box 87).

Box 73d illustrates the cumulative non-recognized weight error increasing to 6,797.0 lbs.

Referring now to FIG. 10 there is shown a chart-illustrating the non-recognized weight error associated with the weighing of the empty aircraft. AC120-27E provides the Regulatory Authority guidance for use of scales when weighing the empty aircraft, but makes no specific requirements for scales accuracy.

b. An operator should establish and follow instructions for weighing the aircraft that are consistent with the recommendations of the aircraft manufacturer and scale manufacturer. The operator should insure that all scales are certified by the manufacturer or a certified laboratory, such as a civil department of weights and measures, of the operator may calibrate the scale under an approved calibration program.

Page 4 Par 104b-AC120-27E:6/10/05

Scale accuracy typically range with a 0.25% error in the amount of the full weight capability of the scale. Typical platform weighing scales have a maximum weight limitation of 60,000 lbs., thus a 0.25% error would tolerate up to 150 lbs. of error for each scale. While weighing an aircraft, the aircraft must be supported by at least three points. Multiplying by three the 150 lbs. scale tolerances illustrates the 450 lbs. error (shown in box 89).

Regulatory Authorities allow airlines with large fleets of common aircraft types to avoid having to weigh every aircraft in their fleet on the required 3-year intervals. A large domestic air carrier operates a single fleet type of totaling 450 of the Boeing 737-700 aircraft. AC102-27E prescribes the minimum number of aircraft whose weight shall be measured in determining the "average aircraft fleet weight" is defined as a minimum of 6 aircraft, plus 10% of the remaining fleet. The equation for this numbers is: 6+[(450−6)×10%]=50.4 which is rounded up to 51 aircraft. A rotation of 51 separate aircraft, within the common fleet type, must be re-weighed within 3-year intervals. AC120-27E also requires that no aircraft within the fleet shall be allowed to operate with an OEW which is heavier than 0.5% of the fleet average weight. AC120-27E allocated no weight error in OEW for aircraft contained within an average fleet weighing program. The additional non-recognized 0.5% weight error applied to the Boeing 737-800 OEW of 91,108 lbs. is 455.5 lbs. (shown in box 91).

Box 73e illustrates the cumulative non-recognized weight error increasing to 7,364.9 lbs.

In creating a justification basis for Regulatory Authority allowance for the non-recognized weight errors to be allowed as additional weight to the MRampW, MTOW, MLW and MZFW; the Regulatory Authorities must be assured that no other weight errors be allowed in the process for determining aircraft weight. Use of an aircraft weight measuring devise, whether it be ground scales with a typical error of 0.25% or a system permanently attached to the aircraft with typical errors no more than 1.0%, can assure Regulatory Authorities that the non-recognized weight errors can be reduced to errors no larger than those errors in the devices which physically measure the fully loaded aircraft total weight.

The subtraction of the 1,742.0 lbs. (shown in box 93) being the 1.0% error associated with the aircraft weighing device, measuring up to the 174,200 lbs. MTOW limitation of the Boeing 737-800 aircraft, from the total non-recognized weight errors of 7,364.9 lbs. (shown in box 73e) equates to a potential weight increase of 5,622.9 lbs. (shown in box 95) to the MTOW. 5,622.9 lbs. divided as a percentage of the 174,200 lbs. total aircraft weight equates into a 3.4% increase in the MTOW for the Boeing 737-800. The use of an aircraft weight measuring device to eliminate any non-recognized weight errors in excess of weight error associated with the aircraft weight measuring device creates a justification basis for an Equivalent Level of Safety for a Regulatory Authority to allow a MTOW increased weight equivalent to the net difference between the non-recognized weight errors, and the aircraft weight measuring devices error tolerances.

Figure 11:
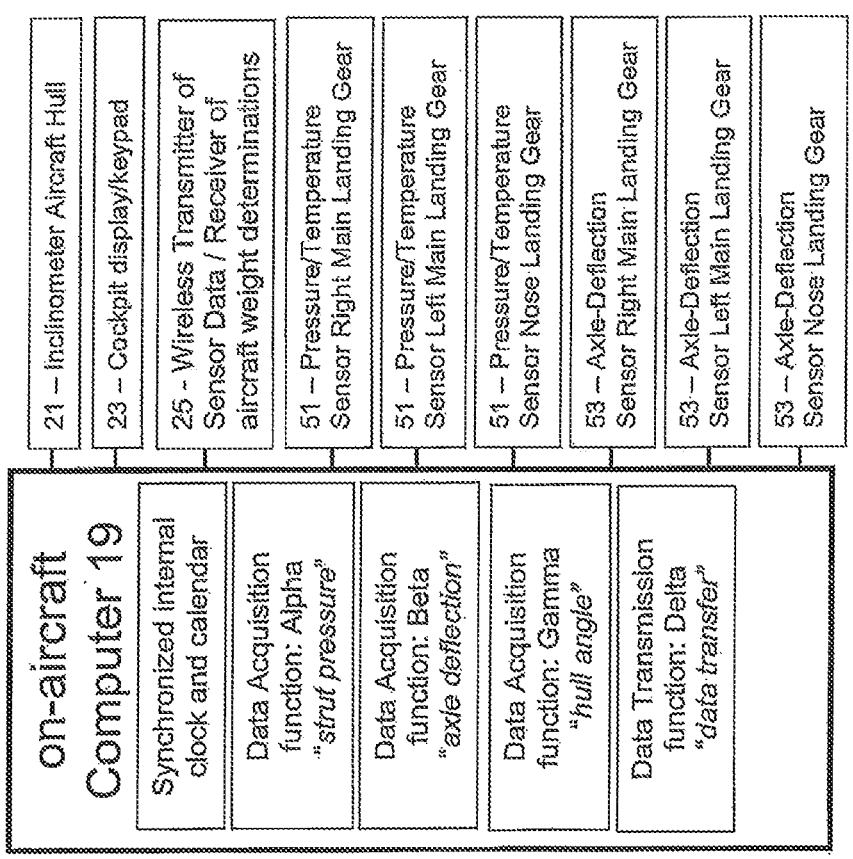
FIG. 11 is an apparatus block diagram illustrating both on-aircraft computer with inputs from strut pressure/temperature and axle deflection sensors, and off-aircraft computer with various software programs for measuring aircraft weight; in accordance with a preferred embodiment of the present invention.

Referring now to FIG. 11 there is shown a block diagram illustrating both the on-aircraft computer 19, with various sensor inputs and the off-aircraft computer 39 with various Software Programs; being part of the apparatus of the invention. Sensor inputs to on-aircraft computer 19 include multiple inputs from (respective nose 3, left-main 5 and right-main 7 landing gear) strut pressure sensors. Strut pressure sensor 51 incorporates a temperature sensor for monitoring internal temperature within the landing gear strut. Sensor inputs to on-aircraft computer 19 also include multiple inputs from (respective nose 3, left-main 5 and right-main 7 landing gear) landing gear axle deflection measuring sensors 53. Aircraft hull inclinometer 21, is located on any horizontal portion of the aircraft 1, and also has an input to on-aircraft computer 19. On-aircraft computer 19 has a cockpit display and keypad 23, which allows pilots to discern information from and input data to on-aircraft computer 19. The on-aircraft computer 19 outputs of data and information are transmitted via a wireless transmitter/receiver 25, to a wireless transmitter/receiver 43 attached to off-aircraft computer 39. Various changes of aircraft hull angle, measured by inclinometer 21 are inputs to on-aircraft computer 19.

Both on-aircraft computer 19 and off-aircraft computer 39 are equipped with internal synchronized clocks and calendars, to document the time and date of recorded and received sensor data.

On-aircraft computer 19 has multiple data acquisition/transmission functions which include:

Data Acquisition function "Alpha" which monitors nose and main landing gear internal strut pressure and temperature; and stores the recorded with time and date references to respective strut pressure and temperature measurements to such time as the data is transmitted to off-aircraft computer 39.

Data Acquisition function "Beta" which monitors nose and main landing gear axle deflections; and stores the recorded data with time and date references to respective axle deflection measurements to such time as the data is transmitted to off-aircraft computer 39.

Data Acquisition function "Gamma" which monitors changes the angle of aircraft hull in relation to the level and horizontal ground; and stores the recorded data with time and date references to hull angle change measurements to such time as the data is transmitted to off-aircraft computer 39.

Data Transmission function "Delta" which wirelessly transmits the time and date referenced landing gear sensor data and aircraft hull angle data to off-aircraft computer 39.

On-aircraft computer 19 is limited to landing gear sensor data acquisitions functions and the transmission of that landing gear load data to off-aircraft computer 39. On-aircraft computer 19 is restricted having operating software which calculates the aircraft weight and CG. Having the sophisticated software to make the calculations for "flight critical information" such as aircraft Weight and CG; operating solely within off-aircraft computer 39, substantially reduces the costs for certifying any subordinate software used in the acquisition of landing gear sensor data, residing within on-aircraft computer 19.

Off-aircraft computer 39 has capabilities for wireless reception and transmission of multiple landing gear and aircraft hull angle sensor data records and Software packages and data acquisition/transmission functions which include:

Software Program "Zeta" which processes recorded pressure and temperature sensor data from the respective nose and main landing gear to resolve into values equivalent to the weight supported at each respective landing gear, Software Program "Eta" which processes recorded axle deflection sensor data from the respective nose and main landing gear to resolve into values equivalent to the weight supported at each respective landing gear, Software Program "Theta" which processes recorded aircraft hull inclination sensor data from the on-aircraft inclinometer to resolve into a value of off-set equivalent to the aircraft being horizontal, Software Program "Kappa" which re-processes respective landing gear weight values to determine the total aircraft weight and the aircraft CG as compared to weight and CG limitation thresholds. If a weight and or CG threshold is exceeded, notification of such exceedance will be given.

Software Program "Lambda" which receives manual inputs regarding respective LBUM weight and CG determinations to be compared to as Software program "Kappa" weight and CG determinations to develop a data-base to compute the amounts of non-recognized weight errors historically allowed to be transported on the aircraft, Data Transmission function "Sigma" which wirelessly transmits back to on-aircraft computer 19 the time and date referenced aircraft weight and CG determinations corresponding to the landing gear sensor data processed.

Referring now to FIG. 12 there is shown a first illustration in an extended process design, configured within this first flow-chart for the methodology for obtaining Regulatory Authority Approval for the allowance to periodically measure aircraft weight in order to increase Regulated aircraft weight limitations. This FIG. 12 is followed by FIG. 13 and FIG. 14 which together encapsulate the justification basis, implementation of system hardware, continued airworthiness and safety procedures with protocols required for aircraft historically using assumed weight values in the determination of aircraft take-off weights, to be allowed to take-off at weights higher than currently certified MTOW limitations, when using a system to measure aircraft weight; where such higher MTOW limitations are no greater than the statistical errors compounded through the use of a variety of un-measured and assumed weights.

The methods on this invention can be extrapolated across the various aircraft weight limitations (MRampW, MTOW, MLW, MZFW) as set by Regulatory Authorities, all of which are determined in some part by the various weight assumptions assigned to male passengers, female passengers, average baggage, heavy baggage and fuel loaded onto the aircraft in various ranges of temperature;

In this FIG. 12, there is shown a view of a process design flow chart for a "Method of Obtaining Relief from Regulated Aircraft MTOW Limitations". Relief to increase MTOW limitations, from the Regulatory Authorities is required for the subsequent operation of the aircraft at a second higher MTOW limitation. In this example: an on-board weighing system being installed onto the aircraft is used for initial computation for the "new" aircraft MTOW limitation, where measured aircraft weights are recorded and compared to respective computed aircraft weights as determined by the LBUM. This process is developed for a particular aircraft type and model, such as with this example, the Boeing 737-800. Once the determination of the amount of increase for the "new" MTOW is made, the allowable weight increase shall be applied to all aircraft of that type and model which utilize an adequate aircraft weight measuring system in conjunction with the prescribed periodic aircraft weighings as stipulated by the Aircraft Weight Reliability Program. For example, the amount of weight increased allowed for the Boeing 737-800 will not be the sane amount of allowable weight increase for the Boeing 737-700 aircraft. Though both aircraft are of the same 737 type, they each have different weight limitations.

With the Aircraft Weight Measuring "System" being used to physically measure the aircraft weight, pilots are assured that a gross weight error will not go un-noticed that might create a safety hazard for a particular flight.

Upon the computation of a new increased Max Take-Off Weight limitation, predicated on a recognition of the non-recognized weight errors and subsequently measured aircraft take-off weights, and the apparatus to measure and verify take-off weights on all subsequent take-off events, a system support mechanism is created to document the processes, procedures and limitations for the use of the apparatus and methods of this invention, that Regulatory Authorities are assured an Equivalent Level of Safety is maintained. These include, but are not limited to creating and maintaining Instructions for Continued Airworthiness, addition of an Approved Flight Manual Supplement covering this new aircraft weight measuring system operation, limitations and procedures, as well as operational adjustments in the event the aircraft weight measurement system is inoperable.

Also required is a complete "Documentation of the Justification Basis" for the issuance of an Equivalent Level of Safety, Special Condition, Exemption, or other alternate means of regulatory compliance. These factors include a review of the historical basis of regulatory requirement, along with advancement in technology and operating procedures. Some of these advancements include the development of new systems and procedures that aid pilots in identifying proper aircraft stabilizer and trim settings with systems.

Continued safe operation of the aircraft will be maintained by the subsequently implemented practice of measured aircraft weight determinations being made from measured landing gear load sensor data, rather than weight assumptions made in AC120-27E. Continued safe operation of the aircraft will be maintained by subsequent monitoring of aircraft operational landing loads, at each respective landing gear.

These supporting materials, data and procedures are submitted to the Regulatory Authority as justification for the Regulatory Authority's acknowledgement and approval to allow an increase in MTOW, MRampW, MLW and MZFW limitations equivalent to the amount of non-recognized weight errors allowed by AC120-27E assumptions of a variety of weight elements; to increase the aircraft MTOW, MRampW, MLW and MZFW limitations, with this demonstration of an Equivalent Level of Safety, or other qualifying document. An illustration of the extended process design, configured within this initial flow-chart of the methodology for obtaining Regulatory Authority Approval for the allowance to periodically measure aircraft weight, compared to computed weight, to reveal and document the non-recognized weight errors, as the justification basis to increase Regulated aircraft weight limitations herein is shown within FIG. 12.

Figure 13:
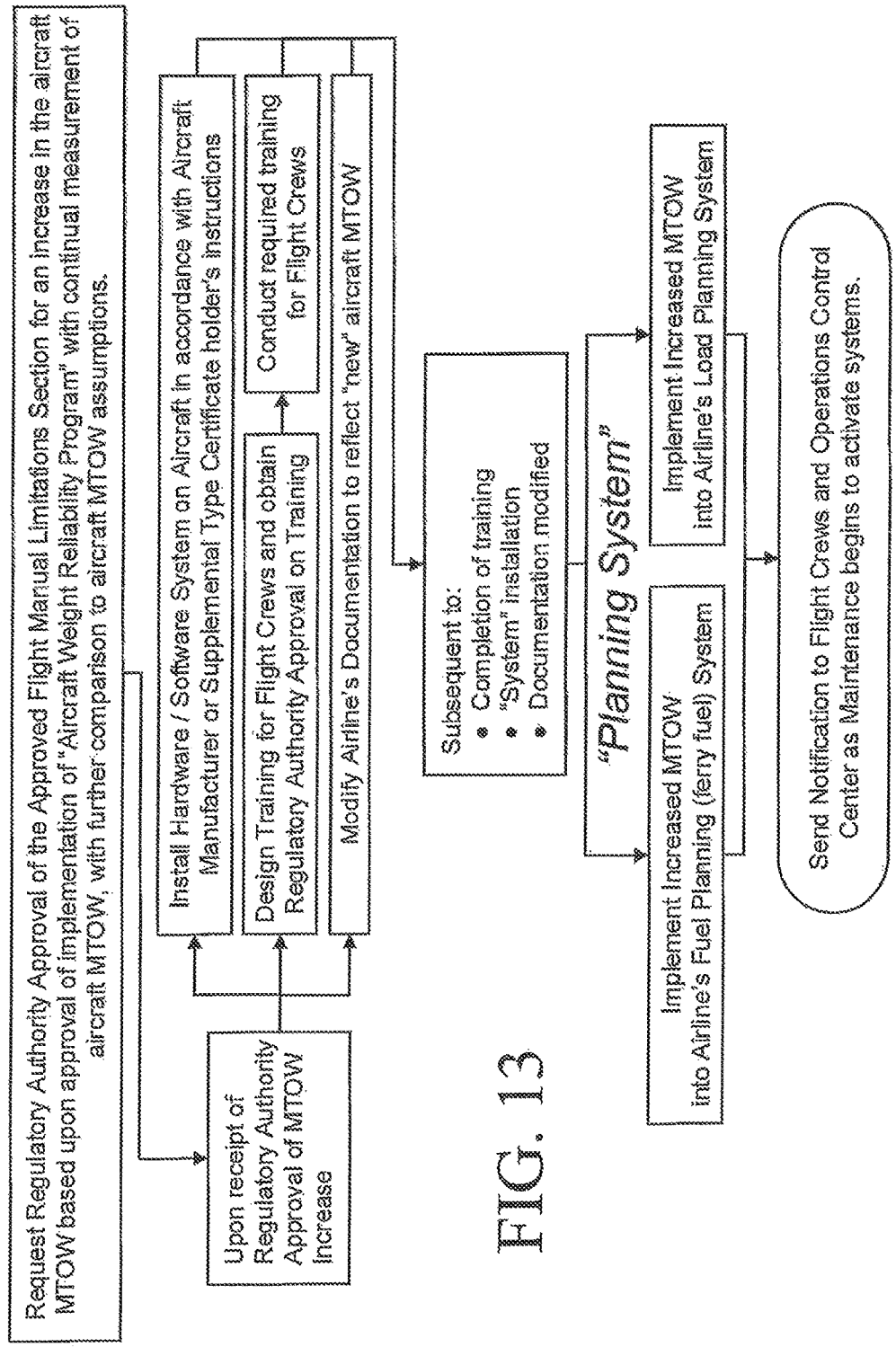
FIG. 13 illustrates the methodology for Regulatory Authority Implementation for the allowance to periodically measure aircraft weight in order to increase a Regulated aircraft's MTOW limitations.
Figure 14:
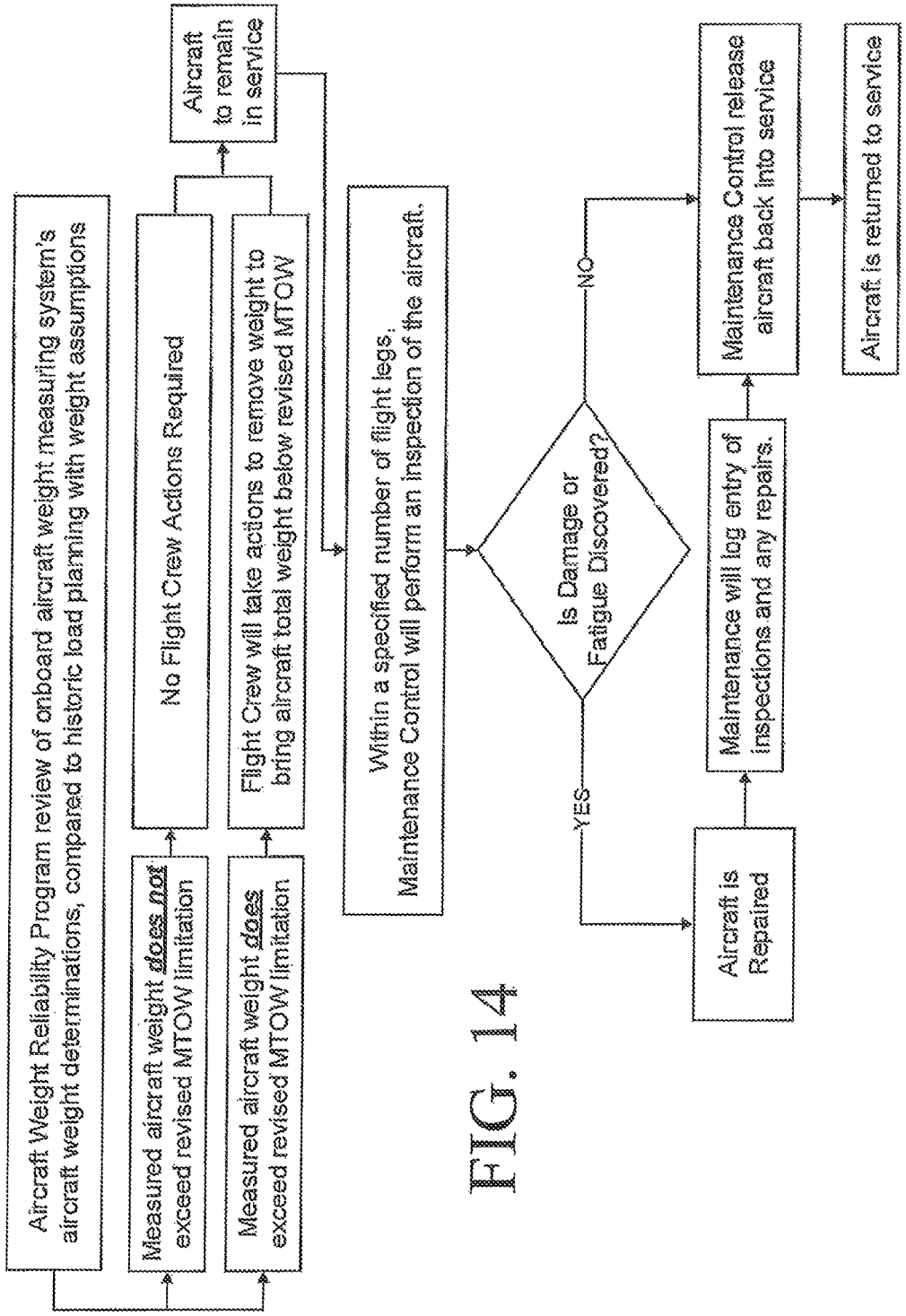
FIG. 14 illustrates the methodology for Regulated Air Carrier Operations to periodically measure aircraft weight in order to increase a Regulated aircraft's MTOW limitations.

Referring now to FIG. 13 there is shown a view of a second process design flow chart for a "Method of Obtaining and Implementing MTOW limitations for aircraft. This additional system support mechanism is created to document the processes, procedures and limitations for the use of the apparatus and methods of this invention, that Regulatory Authorities are assured an Equivalent Level of Safety is maintained. Request is made of the Regulatory Authority to approve modifications to the aircraft's Approved Flight Manual Limitations section regarding the increase in aircraft MTOW limitations. Upon such Flight Manual modification approval, the completion of the installation of the aircraft weight measuring system onto the aircraft, in accordance with respective Supplemental Type Certificate installation requirements; the design of newly modified flight training programs for flight crew and implement such training programs for the use and understanding of the new aircraft weight system are completed. The airline which operates the aircraft with the increased MTOW limitations will modify its documentation for each respective aircraft equipped with the aircraft weight measuring system. The airline operating aircraft with the increased MTOW will amend their "fuel planning programs" for increased opportunities to tanker/ferry more economical fuel; and amend their "load planning programs" in accordance with the prescribed weight increases. When these programs and processes are complete, notification can be made to flight crews and the airline's Operational Control Center, as Maintenance Control activates the aircraft weight systems, fleet-wide. An illustration of this process design, configured within this second flow-chart of the methodology for obtaining and implementing the increased MTOW limitation for Regulated aircraft, herein is shown within FIG. 13, Referring now to FIG. 14 there is shown view of a process design flow chart, for required pre-take-off and or post-landing actions, to be followed by aircraft Flight Crew and Maintenance Control personnel, upon observance of any weight threshold exceedance indications from periodic weight and CG measurements. This additional system support mechanism is created to document the processes, procedures and limitations for the use of the apparatus and methods of this invention; so that Regulatory Authorities are assured an Equivalent Level of Safety is maintained. In the preferred embodiment of this invention the aircraft weight measuring system will display any aircraft weight "Threshold" exceedance within 4 defined ranges.

1. The first range of measurements will be those of exceeding any revised higher MTOW limitation. If the measured aircraft weight is determined to be higher than the revised higher MTOW (take-off) limitations, steps will be taken to remove weight from the aircraft until the measured weight of the aircraft no longer exceeds the revised higher MTOW limitation. Current weight assumptions can allow an aircraft to exceed the revised higher MTOW limitations and such exceedance will remain unknown. Restrictions precluding aircraft operation beyond the revised higher MTOW limitation offer a "Superior Level of Safety." If the aircraft weight measuring system is discovered inoperative, the aircraft MTOW limitation shall revert back to its original lower MTOW limitation.
2. The second range of measurements will be those of exceeding any revised higher MLW (landing) limitation. If the measured aircraft weight is determined to be higher than the revised higher MTOW limitations, it shall be assumed that revised higher MLW limitations would be exceeded by an equivalent value. Steps will be taken to remove weight from the aircraft until the measured weight of the aircraft no longer exceeds the revised higher MTOW limitation, thus the planned MLW limitation will remain within the revised higher MLW limitation.
3. The third range of measurements will be those of exceeding any revised higher MZFW (zero-fuel) limitation. If the measured aircraft weight is determined to be higher than the revised higher MTOW limitations, it shall be assumed that revised higher MZFW limitations would be exceeded by an equivalent value. Steps will be taken to remove weight from the aircraft until the measured weight of the aircraft no longer exceeds the revised higher MZFW limitation, thus the planned MZFW limitation will remain within the revised higher MZFW limitation.
4. The fourth range of measurements will be those of exceeding any revised higher MRampW (ramp/taxi) limitation. The Ramp weight is the heaviest assumed weight that the aircraft can be allowed to taxi around the airport. Prior to take-off the aircraft is much heavier, while carrying the additional weight of the fuel anticipated to be used on the flight. If the measured aircraft weight is determined to be higher than the revised higher MTOW limitations, it shall be assumed that revised higher MRampW limitations would be exceeded by an equivalent value. Steps will be taken to remove weight from the aircraft until the measured weight of the aircraft no longer exceeds the revised higher MRampW limitation, thus the planned MRampW limitation will remain within the revised higher MRampW limitation.

Within a prescribed number of flight legs, the aircraft will be return to a maintenance facility for an inspection of the aircraft for signs that flight operating at the increased weight limitations might create additional fatigue damage to the aircraft. If no damage is found, the aircraft will be returned to service. If damage is discovered, the damage will be repaired, and noted into the aircraft's maintenance log.

Additionally the aircraft may have modifications applied to specific areas of the airframe structure to reinforce and correct for potential future fatigue damage, as noticed from the ongoing aircraft inspections. An illustration of this process design, configured within this third flow-chart of the methodology for periodic inspection to insure continued airworthiness of the aircraft will be maintained with the increased MTOW limitation for Regulated aircraft, herein is shown within FIG. 14.

It is understood that aircraft forward and aft CG limitations are defined and set by the Regulatory Authorities, with such forward and aft limitations based on the assumptions of the various weight components being placed at defined and known locations within the aircraft. Upon determination of the amount of allowed weight increase as a percentage of total aircraft weight (as an example: a 4% weight increase to the MTOW), the equivalent percentage increase (the same 4%) shall be applied to the boundaries of the forward and aft CG limitations.

Described within this invention are methods and strategies developed; in which the whole are now greater than the sum of its parts. Each of the sub-practices of this invention are elements which build upon each other, and strengthen the foundation of justification for the realization that the aircraft design criteria regulations dating back 70 years, have worked well for decades; but the development of new technologies, procedures and the careful implementation and monitoring of such practices offer justification through a finding of an Equivalent Level of Safety, for aviation Regulatory Authorities to allow an increase in the original weight limitations based upon assumed weight values to a second higher weight limitation based upon measure aircraft weight, allow the associated increase to a second set of higher aircraft MRampW, MTOW, MLW and MZFW limitations.

Where previous systems using assumed weight values have been used as a tool to aid pilots with load planning procedures, to help avoid aircraft departures beyond the aircraft safe operational limits, this new invention uses the apparatus and methods to increase the economic value of the aircraft, by bringing to better light that current Regulations are fall short in the accurate determination, of aircraft weight and corresponding aircraft CG; and furthermore by measuring monitoring aircraft weights; allows aircraft to operate at an increased MRampW, MTOW, MLW and MZFW limitations . . . to be at an Equivalent Level of Safety.

Although an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

The invention claimed is:

1. A method of obtaining a change to approved weight limits of a regulated aircraft type, wherein a plurality of aircraft of the aircraft type are each capable of carrying a payload and non-payload items, the payload computed using assumed and averaged weight values, the non-payload items based upon indicated weights of the non-payload items, the aircraft type having a first maximum weight limit, the method comprising the steps of:
   a. For one of the aircraft of the aircraft type, using a computer and modeling programs, simulating plural fully loaded aircraft flights operating near the first maximum weight limit, obtaining statistical and probability data of weight ranges, the statistical and probability data of weight ranges being associated with the assumed and averaged weight values of the payload and the indicated weights of the non-payload items, carried by the aircraft;
   b. Repeating step a) for additional simulated flights, determining an increasing range of assumed payload and non-payload weights;
   c. For a number of actual flights operating near the first maximum weight limit, obtaining computed data for the assumed weight values of the payload and non-payload items;
   d. For the same respective actual flights, comparing the range of statistical and probability data of payload and non-payload weight values, to the computed data for the assumed weight values of the payload and the indicated weights of the non-payload items, and determining a weight difference;
   e. For subsequent actual flights of the plurality of aircraft, using an automated system to measure the respective aircraft total weight, and using the determined weight difference, obtaining a second maximum weight limit for the aircraft type;
   f. For further subsequent actual flights, using an automated system to measure the respective total aircraft weight, while operating the aircraft of the aircraft type at weights within the second maximum weight limit.

2. The method of claim 1, wherein the step of obtaining statistical and probability data of weight ranges further comprises the step of using a computer and random number generator program to provide the statistical and probability data of payload weight ranges, the random number generator program using a predetermined mean and a predetermined standard deviation associated with current assumed payload weight values.

3. The method of claim 1, wherein the step of obtaining statistical and probability data of weight ranges further comprises the step of periodically measuring actual weights of the payload.

4. The method of claim 1, wherein the step of obtaining computed data for the assumed weight values of the payload items further comprises the step of using Regulatory Authority designated weights provided in a Load Build Up Method.

5. The method of claim 1, wherein the payload comprises passengers, having various weights.

6. The method of claim 1, wherein the payload comprises carry-on items, having various weights.

7. The method of claim 1, wherein the payload comprises checked-baggage, having various weights.

8. The method of claim 1, wherein the indicated non-payload weights comprise an indicated aircraft fuel weight.

9. The method of claim 1, wherein the indicated non-payload weights consist of a determined operating empty weight of one aircraft of the aircraft type.

10. The method of claim 1, wherein the indicated non-payload weights consist of an identified weight range, sampled from a small segment of individually measured aircraft operating empty weights, averaged to a determined single aircraft operating empty weight, using the determined single aircraft operating empty weight for all aircraft of the aircraft type, in a sizeable fleet average operating empty weight program.

11. The method of claim 1, wherein the second maximum weight limit comprises an increase to the first maximum weight limit.

12. The method of claim 1, wherein the second maximum weight limit comprises a decrease from the first maximum weight limit.

13. The method of claim 1, wherein the second maximum weight limit comprises a corresponding maximum takeoff weight limit.

14. The method of claim 1, wherein the second maximum weight limit comprises a corresponding maximum landing weight limit.

15. The method of claim 1, wherein the second maximum weight limit comprises a corresponding maximum zero-fuel weight limit.

16. The method of claim 1, wherein the second maximum weight limit comprises a corresponding maximum ramp weight limit.

17. The method of claim 1, further comprising the step of determining whether the weight of the respective aircraft of the aircraft type is above the first maximum weight limit and near the second maximum weight limit, using a system to measure the total weight of the respective aircraft of the aircraft type.

* * * * *